United States Patent
McKain et al.

(10) Patent No.: US 7,532,807 B2
(45) Date of Patent: May 12, 2009

(54) COMBINED EDITING SYSTEM AND DIGITAL MOVING PICTURE RECORDING SYSTEM

(75) Inventors: James A. McKain, Andover, MA (US); Peter Fasciano, Natick, MA (US); Jeffrey D. Kurtze, Nashua, NH (US); Stephen M. DiSciullo, Danvers, MA (US); Paul H. Greaves, Tyngsboro, MA (US); Harry Der, Westford, MA (US); Morton Tarr, Bolton, MA (US); Alex Vasilevsky, Westford, MA (US)

(73) Assignee: Avid Technology, Inc., Tewksbury, MA (US)

( * ) Notice: Subject to any disclaimer, the term of this patent is extended or adjusted under 35 U.S.C. 154(b) by 622 days.

(21) Appl. No.: 10/897,506

(22) Filed: Jul. 23, 2004

(65) Prior Publication Data
US 2005/0053352 A1 Mar. 10, 2005

Related U.S. Application Data

(60) Division of application No. 09/898,878, filed on Jul. 3, 2001, now Pat. No. 7,230,641, which is a division of application No. 08/932,994, filed on Sep. 18, 1997, now abandoned, which is a continuation of application No. 08/606,050, filed on Feb. 23, 1996, now abandoned, which is a continuation of application No. 08/418,948, filed on Apr. 7, 1995, now abandoned.

(51) Int. Cl.
H04N 7/00 (2006.01)
H04N 5/00 (2006.01)
(52) U.S. Cl. .................... 386/107; 386/117
(58) Field of Classification Search ............ 386/52, 386/55, 117, 107, 125, 104, 118, 38
See application file for complete search history.

(56) References Cited

U.S. PATENT DOCUMENTS 2,927,154 A    3/1960   Wolfe (Continued)

FOREIGN PATENT DOCUMENTS

DE    4304506 A1   8/1993
EP    0210497      2/1987

OTHER PUBLICATIONS

U.S. Appl. No. 08/932,993, filed Sep. 18, 1997, McKain et al.
U.S. Appl. No. 08/932,784, filed Sep. 18, 1997, McKain et al.

(Continued)

*Primary Examiner*—Robert Chevalier
(74) *Attorney, Agent, or Firm*—Peter J. Gordon; Fish & Richarson; Oliver Strimpel

(57) ABSTRACT

A moving picture recording device includes a random-access, computer-readable and writable storage medium to provide non-linear access to recorded clips. The device provides digital capture of both video and audio information. Multiple data paths are provided to allow recording to and playback from the storage medium. Lists are maintained to manage recorded clips and edited events. An outtake list of deleted clips is also maintained. An event list includes a list of video events including clips from the storage medium as well as other video sources including a camera or external video. With switching circuitry, recorded clips can be viewed during editing while live images are output to a program output. An editing interface includes dedicated keys for performing standard recording functions as well as a display with associated input keys having adaptive functions. The textual display indicates the function currently associated with the input key. This display provides a simple interface for editing video without a mouse or other external input device or complex graphical user interface. The interface also may allow a user to input a value, stored as an attribute of a clip, that represents the merit of the clip. These attributes may be used to rank and/or select clips.

16 Claims, 13 Drawing Sheets

U.S. PATENT DOCUMENTS

| | | |
|---|---|---|
| 3,594,513 A | 7/1971 | Greenberg |
| 3,617,626 A | 11/1971 | Bluth et al. |
| 3,875,329 A | 4/1975 | Nagel |
| 4,061,228 A | 12/1977 | Johnson |
| 4,106,846 A | 8/1978 | Russin |
| 4,139,903 A | 2/1979 | Morrill, Jr. et al. |
| 4,176,897 A | 12/1979 | Cameron |
| 4,195,317 A | 3/1980 | Stratton |
| 4,257,063 A | 3/1981 | Loughry |
| 4,281,354 A | 7/1981 | Conte |
| 4,285,483 A | 8/1981 | Cipollone |
| 4,295,154 A | 10/1981 | Hata |
| 4,346,205 A | 8/1982 | Hiles |
| 4,373,193 A | 2/1983 | Haag et al. |
| 4,378,572 A | 3/1983 | Hoffmann |
| 4,390,904 A | 6/1983 | Johnston et al. |
| 4,408,309 A | 10/1983 | Kiesling et al. |
| 4,409,670 A | 10/1983 | Herndon et al. |
| 4,480,317 A | 10/1984 | Haag et al. |
| 4,507,689 A | 3/1985 | Kozuki |
| 4,516,678 A | 5/1985 | Fortiadis et al. |
| 4,523,226 A | 6/1985 | Lipton |
| 4,538,188 A | 8/1985 | Barker |
| 4,547,815 A | 10/1985 | Kimura |
| 4,550,343 A | 10/1985 | Nakatani |
| 4,567,532 A | 1/1986 | Baer et al. |
| 4,568,133 A | 2/1986 | Amano et al. |
| 4,635,136 A | 1/1987 | Ciampa et al. |
| 4,642,682 A | 2/1987 | Orsburn |
| 4,646,241 A | 2/1987 | Ratchford et al. |
| 4,654,848 A | 3/1987 | Noguchi |
| D289,290 S | 4/1987 | Enomoto et al. |
| 4,660,102 A | 4/1987 | Kawakami et al. |
| 4,675,755 A | 6/1987 | Baumeister et al. |
| 4,685,003 A | 8/1987 | Westland |
| 4,688,016 A | 8/1987 | Fok |
| 4,689,683 A | 8/1987 | Efron |
| 4,695,887 A | 9/1987 | Peterson |
| 4,695,888 A | 9/1987 | Peterson |
| 4,695,891 A | 9/1987 | Peterson |
| 4,695,905 A | 9/1987 | Utsugi |
| 4,714,962 A | 12/1987 | Levine |
| D293,784 S | 1/1988 | Miyashita et al. |
| 4,717,971 A | 1/1988 | Sawyer |
| 4,746,990 A | 5/1988 | Katoh et al. |
| 4,752,834 A | 6/1988 | Koombes |
| 4,755,889 A | 7/1988 | Schwartz |
| 4,774,570 A | 9/1988 | Araki |
| 4,777,537 A | 10/1988 | Ueno et al. |
| 4,792,864 A | 12/1988 | Watandabe |
| 4,816,901 A | 3/1989 | Music |
| 4,819,101 A | 4/1989 | Lemelson |
| 4,823,285 A | 4/1989 | Blancato |
| 4,835,736 A | 5/1989 | Easterday |
| 4,841,503 A | 6/1989 | Yamada et al. |
| 4,847,677 A | 7/1989 | Music |
| 4,855,813 A | 8/1989 | Russell |
| 4,856,656 A | 8/1989 | Sugimoto et al. |
| 4,857,990 A | 8/1989 | Horgan |
| 4,864,391 A | 9/1989 | Taguchi |
| 4,864,429 A | 9/1989 | Eigeldinger |
| 4,872,054 A | 10/1989 | Gray |
| 4,879,611 A | 11/1989 | Fukui et al. |
| 4,891,715 A | 1/1990 | Levy |
| 4,894,789 A | 1/1990 | Yee |
| 4,897,741 A | 1/1990 | Inoue et al. |
| 4,901,161 A | 2/1990 | Giovanella |
| 4,918,523 A | 4/1990 | Simon |
| 4,924,303 A | 5/1990 | Brandon |
| 4,926,291 A | 5/1990 | Sarraf |
| 4,928,171 A | 5/1990 | Kline |
| 4,935,816 A | 6/1990 | Faber |
| 4,937,676 A | 6/1990 | Finelli et al. |
| 4,943,866 A | 7/1990 | Barker et al. |
| 4,963,995 A | 10/1990 | Lang |
| 4,969,042 A | 11/1990 | Houtman et al. |
| 4,970,663 A | 11/1990 | Bedell et al. |
| 4,982,290 A | 1/1991 | Nishi et al. |
| 4,982,390 A | 1/1991 | Tanaka |
| 5,010,499 A | 4/1991 | Yee |
| 5,012,327 A | 4/1991 | Bishop |
| 5,027,400 A | 6/1991 | Baji et al. |
| 5,038,319 A | 8/1991 | Carter et al. |
| 5,045,940 A | 9/1991 | Peters et al. |
| 5,056,056 A | 10/1991 | Gustin |
| 5,057,932 A | 10/1991 | Lang |
| 5,067,130 A | 11/1991 | Jackson |
| 5,083,313 A | 1/1992 | Reinsch |
| 5,084,775 A | 1/1992 | Kodama et al. |
| 5,099,322 A | 3/1992 | Gove |
| 5,099,337 A | 3/1992 | Cury |
| 5,103,301 A | 4/1992 | Cosentino |
| 5,115,311 A | 5/1992 | Jaqua |
| 5,119,178 A | 6/1992 | Sakata et al. |
| 5,119,191 A | 6/1992 | Van den Heuvel |
| 5,121,440 A | 6/1992 | Ballard et al. |
| 5,121,470 A | 6/1992 | Trautman |
| 5,124,807 A | 6/1992 | Dunlap et al. |
| 5,126,851 A | 6/1992 | Yoshimura |
| 5,132,800 A | 7/1992 | Wada et al. |
| 5,133,079 A | 7/1992 | Ballantyne |
| 5,134,661 A | 7/1992 | Reinsch |
| 5,138,459 A | 8/1992 | Roberts et al. |
| 5,140,414 A | 8/1992 | Mowry |
| 5,144,461 A | 9/1992 | Horan |
| 5,155,584 A | 10/1992 | Taguchi et al. |
| 5,157,512 A | 10/1992 | Inada et al. |
| 5,164,839 A | 11/1992 | Lang |
| 5,168,363 A * | 12/1992 | Kojima et al. ............... 348/704 |
| 5,173,779 A | 12/1992 | Lee |
| 5,179,437 A | 1/1993 | Kawada et al. |
| 5,192,999 A | 3/1993 | Graczyk |
| 5,211,566 A | 5/1993 | Bates et al. |
| 5,227,863 A | 7/1993 | Bilbrey |
| 5,231,501 A | 7/1993 | Sakai |
| 5,233,438 A | 8/1993 | Funahashi et al. |
| 5,237,648 A | 8/1993 | Mills et al. |
| 5,239,419 A | 8/1993 | Kim |
| 5,241,389 A | 8/1993 | Bilbrey |
| 5,241,428 A | 8/1993 | Goldwasser et al. |
| 5,253,078 A | 10/1993 | Balkanski |
| 5,262,877 A | 11/1993 | Otsuka |
| 5,267,351 A | 11/1993 | Reber et al. |
| 5,270,831 A | 12/1993 | Parulski |
| 5,274,758 A | 12/1993 | Beitel et al. |
| 5,282,092 A | 1/1994 | Wilhelms |
| 5,283,819 A | 2/1994 | Glick |
| 5,301,026 A | 4/1994 | Lee |
| 5,301,240 A | 4/1994 | Stockhum et al. |
| 5,306,956 A | 4/1994 | Ikeda et al. |
| 5,307,456 A | 4/1994 | MacKay |
| 5,309,528 A | 5/1994 | Rosen et al. |
| 5,325,202 A | 6/1994 | Washino |
| 5,329,320 A | 7/1994 | Yifrach |
| 5,345,313 A | 9/1994 | Blank |
| 5,355,450 A | 10/1994 | Garmon et al. |
| 5,371,551 A | 12/1994 | Logan et al. |
| 5,372,515 A | 12/1994 | Miller et al. |
| 5,384,667 A | 1/1995 | Beckwith |
| 5,390,028 A | 2/1995 | Kobayashi et al. |
| 5,408,383 A | 4/1995 | Nagasaka et al. |
| 5,424,755 A | 6/1995 | Lucas et al. |
| 5,431,161 A | 7/1995 | Ryals et al. |
| 5,434,678 A | 7/1995 | Abecassis |

| | | |
|---|---|---|
| 5,450,140 A | 9/1995 | Washino |
| 5,452,378 A | 9/1995 | Rosen et al. |
| 5,471,666 A | 11/1995 | Sugiyama et al. |
| 5,477,264 A | 12/1995 | Sarbadhikari et al. |
| 5,479,205 A | 12/1995 | Silverbrook |
| 5,483,285 A | 1/1996 | Lim et al. |
| 5,488,433 A | 1/1996 | Washino et al. |
| 5,497,193 A | 3/1996 | Mitsuhashi et al. |
| 5,532,740 A | 7/1996 | Wakui |
| 5,533,193 A | 7/1996 | Roscoe |
| 5,534,921 A | 7/1996 | Sawanobori |
| 5,537,157 A | 7/1996 | Washino et al. |
| D373,778 S | 9/1996 | Fasciano et al. |
| 5,568,275 A | 10/1996 | Norton et al. |
| 5,579,239 A | 11/1996 | Freeman et al. |
| 5,633,837 A | 5/1997 | Gantt |
| 5,636,360 A | 6/1997 | Courts et al. |
| 5,661,823 A | 8/1997 | Yamauchi |
| 5,701,383 A | 12/1997 | Russo et al. |
| 5,715,018 A | 2/1998 | Fasciano et al. |
| 5,724,605 A | 3/1998 | Wissner |
| 5,771,330 A | 6/1998 | Takano et al. |
| 5,802,361 A | 9/1998 | Wang et al. |
| 5,842,170 A | 11/1998 | Daberko et al. |
| 5,946,445 A | 8/1999 | Peters et al. |
| 5,966,495 A | 10/1999 | Takahashi et al. |
| 5,999,406 A | 12/1999 | McKain et al. |
| 6,011,898 A | 1/2000 | Iwasaki et al. |
| 6,035,367 A | 3/2000 | Laws |
| 6,058,236 A | 5/2000 | Peters et al. |
| 6,118,444 A * | 9/2000 | Garmon et al. ............. 715/723 |
| 6,339,531 B1 | 1/2002 | McKain et al. |
| 6,678,461 B1 | 1/2004 | Peters et al. |
| 2003/0034997 A1 | 2/2003 | McKain et al. |
| 2003/0194206 A1* | 10/2003 | Peters et al. .................. 386/46 |
| 2003/0206715 A1 | 11/2003 | Peters et al. |

FOREIGN PATENT DOCUMENTS

| | | |
|---|---|---|
| EP | 0438299 | 7/1991 |
| EP | 0469850 | 2/1992 |
| EP | 0473322 | 4/1992 |
| EP | 0560624 | 9/1993 |
| EP | 0617542 | 9/1994 |
| EP | 0618739 | 10/1994 |
| EP | 0645765 | 3/1995 |
| GB | 2242304 | 9/1991 |
| GB | 2286282 A | 8/1995 |
| JP | 1-502940 | 10/1989 |
| JP | 5-95527 | 4/1993 |
| JP | 3-314435 | 6/1993 |
| JP | 5-159536 | 6/1993 |
| JP | 6-110425 | 4/1994 |
| JP | 6-276471 | 9/1994 |
| JP | 6-309861 | 11/1994 |
| WO | WO93/12481 | 6/1993 |
| WO | WO93/21635 | 10/1993 |
| WO | WO93/24932 | 12/1993 |
| WO | WO94/23428 | 10/1994 |
| WO | WO96/26600 | 8/1996 |
| WO | WO96/26601 | 8/1996 |
| WO | WO/26602 | 8/1996 |

OTHER PUBLICATIONS

Gardner, Larry J., et al., "A Closed-Loop Digital Video Editing System", Aug. 1990, pp. 634-638, SMPTE Journal.

Claims As Pending in related U.S. Appl. No. 11/731,636, filed Mar. 30, 2007.

Claims As Pending in related U.S. Appl. No. 08/932,784, filed Sep. 18, 1997.

Final Office Action dated Jan. 29, 2007, RCE and Reply to the Final Office Action of Jan. 29, 2007, Filed on Oct. 29, 2007 in U.S. Appl. No. 08/932,784.

Office Action of Jan. 11, 2008 in U.S. Appl. No. 08/932,784.

* cited by examiner

FIG. 10

```
F1 | Ready   ON                                      | F7
F2 | Scan <<<          ≡   ≡   ≡   ≡                | F8
                      LR  LR  L-  -R
F3 | Scan >>>                          Sequencer    | F9
F4 | Pause                                  Index   | F10
            BATT  60%  Time  07:20
F5 | Play      0036  02:13:03:03  |=    Help        | F11
F6 | Attributes                           Outtake   | F12
```

FIG. 11

```
F1 | Time   02:13:03:02   =|             Delete    | F7
                                                    —240
F2 | Clip   0035   0017/0035             Insert     | F8
     Clip   ..35   -------  :18
F3 | Event  04  =  0023     :16          Tracks    | F9
        >   05  =  -------  :00          V-1---
F4 | Page 01                               List    | F10
            BATT 60%  Time 07:20
F5 | Play-Pause                           Help      | F11
F6 | Attributes                           Outtake   | F12
```

FIG. 12

```
F1 | Ejected   _____        | F7
F2 | Scan <<<                                       | F8
                      LR  LR  L-  -R
F3 | Scan >>>                          Sequencer    | F9
F4 | Pause                                  Index   | F10
            BATT  60%  Time  --:--
F5 | Play    ----  --:--:--  --         Help        | F11
F6 | Attributes                           Outtake   | F12
```

FIG. 13

```
F1 | Ready   ON      _____  | F7
F2 | Scan <<<                                       | F8
                      LR  LR  L-  -R
F3 | Scan >>>                          Sequencer    | F9
F4 | Pause                                  Index   | F10
            BATT  60%  Time  07:20
F5 | Play      0035  02:13:03:02  <|    Help        | F11
F6 | Attributes                           Outtake   | F12
```

FIG. 14

| F1 | Time --:--:--:-- -- | Delete | F7 |
| F2 | Clip ---- ----/---- Ejected | Insert V-1234 | F8 |
| F3 | Event --<br>> -- | Tracks | F9 |
| F4 | Page 01<br>BATT 60% Time --:-- | List | F10 |
| F5 | Play-Pause | Help | F11 |
| F6 | Attributes | Outtake | F12 |

FIG. 15

| F1 | Time 02:13:03:02 <| | Delete | F7 |
| F2 | Clip 0035 0017/0035<br>Clip ..35 ------- :18 | Insert<br>V-1234 | F8 |
| F3 | Event 04 = 0023 :16<br>> 05 = ------- :00 | Tracks<br>V-1--- | F9 |
| F4 | Page 01<br>BATT 60% Time 07:20 | List | F10 |
| F5 | Play-Pause | Help | F11 |
| F6 | Attributes | Outtake | F12 |

FIG. 16

| F1 | Time 02:13:03:02 <| | | F7 |
| F2 | Clip 0035 0017/0035<br>Time .2:13:03:02 | Recorder<br>V-1234 | F8 |
| F3 | Event 04 = 0023 :16<br>> 05 = -------- :00 | Tracks<br>V-1-- | F9 |
| F4 | Page 01<br>BATT 60% Time 07:20 | List | F10 |
| F5 | Play-Pause | Help | F11 |
| F6 | Attributes | Outtake | F12 |

FIG. 17

| F1 | Time 02:13:03:02 <| | | F7 |
| F2 | Clip 0035 0017/0035<br>Page .1 | Recorder<br>V-1234 | F8 |
| F3 | Event 04 = 0023 :16<br>> 05 = -------- :00 | Tracks<br>V-1-- | F9 |
| F4 | Page 01<br>BATT 60% Time 07:20 | Index | F10 |
| F5 | Play-Pause | Help | F11 |
| F6 | Attributes | Outtake | F12 |

FIG. 18

| F1 | Time    02:13:03:02   <\|              Delete | F7 |
|----|-----------------------------------------------|----|
| F2 | Clip   0035   0017/0035              Insert   | F8 |
|    | Clip   ..35   ------       :18       V.1234   |    |
| F3 | Event  04  =  0023         :16       Tracks  | F9 |
|    |      > 05  =  ------       :00       V-1---  |    |
| F4 | Page 01                                List   | F10 |
|    |            BATT  60%   Time  07:20            |    |
| F5 | Play-Pause                             Help   | F11 |
| F6 | Attributes                          Outtake   | F12 |

FIG. 19

| F1 | Time    02:13:03:02   <\|              Delete | F7 |
|----|-----------------------------------------------|----|
| F2 | Clip   0035   0017/0035              Insert   | F8 |
|    | Event  .5  =  0035         :18       VM--34   |    |
| F3 | Event  04  =  0023         :16       Tracks  | F9 |
|    |      > 05  =  0035         :18       VM--34  |    |
| F4 | Page 01                                List   | F10 |
|    |            BATT  60%   Time  07:20            |    |
| F5 | Play-Pause                             Help   | F11 |
| F6 | Sequence                            Outtake   | F12 |

FIG. 20

| F1 | Accept/Yes              | V   | Video  On | F7 |
|----|-------------------------|-----|-----------|----|
| F2 | Clip  0035  0017/0035   |     | Patch  -- | F8 |
|    | Clip  0035  ------      |     |           |    |
| F3 | Event 04 = 0023         | 1   |       On  | F9 |
|    |     > 05 = --------     |     |           |    |
| F4 | Page 01                 | 2   |       On  | F10 |
| F5 | Play-Pause              | 3   |       --  | F11 |
| F6 | Set Play Track          | 4   |       --  | F12 |

FIG. 21

| F1 | Accept/Yes              | V   | Video   On  | F7 |
|----|-------------------------|-----|-------------|----|
| F2 | Clip  0030  0017/0035   |     | MIC  >  On  | F8 |
|    | Event .5    0030        |     | M>  C1  C2  |    |
| F3 | Event 04 = 0023         | 1   | LR  ..  --  | F9 |
|    |     > 05 = --------     |     |             |    |
| F4 | Match Marks/Continue    | 2   | --  ..  --  | F10 |
| F5 | VM..34 1st Clip 0030    | 3   | --  L.  --  | F11 |
|    | VM..34 New Clip 0030    |     |             |    |
| F6 | . . . . 2nd Clip ----   | 4   | --  .R  --  | F12 |

FIG. 22

| F1 | Time 02:13:03:02 <\| | Delete | F7 |
|---|---|---|---|
| F2 | Clip 0035 0017/0035 | Insert | F8 |
|    | Clip ..25 | | |
| F3 | Event 04 = 0023 :16 | Tracks | F9 |
|    | > 05 = ------ :00 | V-1--- | |
| F4 | Page 01 | List | F10 |
|    | BATT 60% Time 07:20 | | |
| F5 | GOTO | Help | F11 |
| F6 | Set Counter | Outtake | F12 |

FIG. 23

| F1 | Time 02:04:45:03 >= | Delete | F7 |
|---|---|---|---|
| F2 | Clip 0025 0017/0035 | Insert | F8 |
|    | Clip .25 ------ :08 | V-1234 | |
| F3 | Event 04 = 0023 :16 | Tracks | F9 |
|    | > 05 = ------ :00 | V-1--- | |
| F4 | Page 01 | List | F10 |
|    | BATT 60% Time 07:20 | | |
| F5 | Play-Pause | Help | F11 |
| F6 | Attributes | Outtake | F12 |

FIG. 24

| F1 | Time 02:05:11:20 >= | Delete | F7 |
|---|---|---|---|
| F2 | Clip 0026 0017/0035 | Insert | F8 |
|    | Clip . .26 ------ :10 | V-1234 | |
| F3 | Event 04 = 0023 :16 | Tracks | F9 |
|    | > 05 = ------ :00 | V-1--- | |
| F4 | Page 01 | List | F10 |
|    | BATT 60% Time 07:20 | | |
| F5 | Play-Pause | Help | F11 |
| F6 | Attributes | Outtake | F12 |

FIG. 25

| F1 | Time 02:08:15:23 >= | Delete | F7 |
|---|---|---|---|
| F2 | Clip 0030 0017/0035 | Insert | F8 |
|    | Event .5 0030 :64 | V-1--- | |
| F3 | Event 04 = 0023 :16 | Tracks | F9 |
|    | > 05 = 0030 :64 | V-1--- | |
| F4 | Page 01 | List | F10 |
|    | BATT 60% Time 07:20 | | |
| F5 | Play-Pause | Help | F11 |
| F6 | Sequence | Outtake | F12 |

FIG. 26

| F1 | Time   02:04:01:12        >=               Delete | F7 |
|----|---------------------------------------------------|----|
| F2 | Clip   0023   0017/0035              Insert       | F8 |
|    | Event   .4  =  0023           :16    VM--34       |    |
| F3 | Event   03  =  Camera         :--    Tracks       | F9 |
|    |   >    04  =  0023            :16    VM--34       |    |
| F4 | Page 01                                      List | F10 |
|    |             BATT  60%   Time   07:20              |    |
| F5 | Play-Pause                                   Help | F11 |
| F6 | Sequence                                  Outtake | F12 |

FIG. 27

| F1 | Time   02:08:15:23        >=               Delete | F7 |
|----|---------------------------------------------------|----|
| F2 | Clip   0030   0017/0035              Insert       | F8 |
|    | Event   .5     0030           :64    V-1---       |    |
| F3 | Event   04  =  0023           :16    Tracks       | F9 |
|    |   >    05  =  -------         :00    V-1---       |    |
| F4 | Page 01                                      List | F10 |
|    |             BATT  60%   Time   07:20              |    |
| F5 | GOTO                                         Help | F11 |
| F6 | Sequence                                  Outtake | F12 |

FIG. 28

| F1 | Time   02:08:15:23        >=               Delete | F7 |
|----|---------------------------------------------------|----|
| F2 | Clip   0030   0017/0035              Insert       | F8 |
|    | Clip    .30   -------         :64    V-1234       |    |
| F3 | Event   05  =  0030           :64    Tracks       | F9 |
|    |   >    06  =  -------         :00    VM--34       |    |
| F4 | Page 01                                      List | F10 |
|    |             BATT  60%  Time  07:20                |    |
| F5 | Play-Pause                                   Help | F11 |
| F6 | Attributes                                Outtake | F12 |

FIG. 29

| F1 | Accept/Yes              | V |         Video On | F7 |
|----|-------------------------|---|------------------|----|
| F2 | Clip 0030   0017/0035   |   |         MIC > ?? | F8 |
|    | Event .5    0030        |   |         M> C1 C2 |    |
| F3 | Event 04 =  0023        | 1 |         LR LR -- | F9 |
|    |   >   05    -------     |   |                  |    |
| F4 | Match Marks/Continue    | 2 |         . . -- --| F10 |
| F5 | VM1...  1st Clip 0030   | 3 |         . . -- --| F11 |
|    | V-1234 New Clip 0030    |   |                  |    |
| F6 | ----    2nd Clip ----   | 4 |         . . -- --| F12 |

FIG. 30

| F1 | Time  02:08:15:23   >=                Delete | F7 |
|----|-----------------------------------------------|----|
| F2 | Clip   0030   0017/0035              Insert  | F8 |
|    | Event   .5  =  0030        :64       V-1---  |    |
| F3 | Event   04  =  0023        :16       Tracks  | F9 |
|    |    >   05  =  0030        :64       V-1---  |    |
| F4 | Page 01                               List   | F10 |
|    |        BATT  60%  Time  07:20                |    |
| F5 | Play-Pause                            Help   | F11 |
| F6 | Are You Sure?                      Outtake   | F12 |

FIG. 31

| F1 | Accept/Yes              | V | Video ..      | F7 |
|----|-------------------------|---|---------------|----|
| F2 | Clip  0017  0017/0035   |   | MIC > On      | F8 |
|    | Event  .5   0030+0017   |   | M> C1  C2     |    |
| F3 | Event  04 = 0023        | 1 | LR -- . .     | F9 |
|    |   >    05 = 0030        |   |               |    |
| F4 | Match Marks/Continue    | 2 | -- -- . .     | F10 |
| F5 | VM--34  1st Clip 0030   | 3 | -- L- . .     | F11 |
|    | V-1234  New Clip 0017   |   |               |    |
| F6 | -----   2nd Clip 0017   | 4 | -- -R . .     | F12 |

FIG. 32

| F1 | Time  02:00:03:17   >=                Delete | F7 |
|----|-----------------------------------------------|----|
| F2 | Clip   0017   0017/0035              Replace | F8 |
|    | Event   .5    0030+0017   :17       VM-234   |    |
| F3 | Event   04  =  0023        :16       Tracks  | F9 |
|    |    >   05  =  0030        :64       VM--34  |    |
| F4 | Page 01                               List   | F10 |
|    |        BATT  60%  Time  07:20                |    |
| F5 | GOTO                                  Help   | F11 |
| F6 | Sequence                           Outtake   | F12 |

COMBINED EDITING SYSTEM AND DIGITAL MOVING PICTURE RECORDING SYSTEM

CROSS-REFERENCE TO RELATED APPLICATIONS

This Application is a divisional application of:
U.S. patent application Ser. No. 09/898,878, filed Jul. 3, 2001, now U.S. Pat. No. 7,230,641, which is a divisional of:
U.S. patent application Ser. No. 08/932,994, filed Sep. 18, 1997, abandoned, which is a continuation of:
U.S. patent application Ser. No. 08/606,050, filed Feb. 23, 1996, abandoned, which is a continuation of:
U.S. patent application Ser. No. 08/418,948, filed Apr. 7, 1995, abandoned;
all of which are hereby incorporated by reference.

FIELD OF INVENTION

This invention related to moving picture recording and editing devices and processes. More particularly, the invention relates to a device for non-linear recording and editing of digital moving pictures.

BACKGROUND OF INVENTION

Present day video recorders are typically a combination of a video camera with a video tape recorder which are constructed so as to be portable. They are often called camcorders or video tape recorders (VTR). For the purposes of this application, they are referred to as video tape recorders. Present day portable tape recorders use a video tape, usually contained within a cassette, as the recording medium. Recording is done in numerous formats, including analog BETA and VHS format, and the digital D1 format. A major disadvantage of video tape recorders is that video tape allows only linear access to a given point on the video tape. That is, if the tape has just finished recording, in order to access the beginning of a recorded session located at the beginning of the tape, the tape is rewound.

The problem of linear access to video tape recordings in most obvious in the field of broadcast television news. Typically, a reporting crew goes to a news location with a video tape recorder to record an event. Upon completion of recording, the tape must be rewound and then played back and transmitted, for example via satellite or microwave line, to a base station in a studio facility. At the base station, the information then can be edited into a final new program.

Editing of moving pictures is commonly done digitally, using a non-linear computer-based editing system such as the Avid/1 Media Composer or NewsCutter available from Avid Technology, Inc. of Tewksbury, Mass. Such a system typically digitizes, or converts analog video signals into a digital, computer-readable format. Even if the video signal is from a digital video tape, linear access to information on the tape still presents the same problems. Tape recording, transmission and digitization are usually performed unless there is an actual live connection from the camera to the base station. Because of the delays in rewinding, playback and transmission of recorded information from a video tape, there is typically a half hour delay between the completion of recording of an event and the time an edited version of the recorded event actually can be broadcast by the base station. This delay is a significant competitive problem in broadcast news where the time to air is very important as stations strive to produce "up to the minute" news coverage and broadcast.

Today, electronic still cameras exist which record a still image on magnetic medium, such as a floppy disk. Such a camera is described in U.S. Pat. No. 5,084,775, issued Jan. 28, 1991, and assigned to Sony Corporation. However, the camera described in that patent records still images only, not full motion video images. In addition, computer video capture systems exist, such as the NuVista video capture card available from RasterOps/Truevision, Inc. Such systems, however, have not been reduced to the portable form of the present invention to perform live digital capture directly from a camera.

Additionally, it has been recently suggested by those skilled in the field of moving picture recording that numerous problems with a non-linear digital moving picture recorder are insurmountable. In particular, it has been suggested that there is a large image quality trade-off with increased recording time capability. Additionally, it has been suggested that, using disk-based media, a little shake of the camera would cause a disk crash. Finally, it has been suggested that the disk media is substantially costlier than tape.

Additionally, while still picture editing is available in some digital still video cameras, such as described in U.S. Pat. No. 5,301,026, such systems are significantly simpler than full motion video editing system, and thus, such a still camera does not have the capability of recording and/or editing moving pictures.

Additionally, it is known that in many television stations there are a variety of switching capabilities to allow multiple sources of information to be fed to a single output channel. These sources are generally locked to and synchronized with the output channel frequency. Switching is performed between vertical time intervals, i.e. between frames, using a vertical time interval switch (VTIS). However, in a camera, there are typically only two sources of output, either live images or playback from tape, which are designed to be preselected by a user during playback but do not incorporate VTIS.

SUMMARY OF THE INVENTION

The present invention combines editing capability, typically found only in a production studio, along with switching capabilities, typically found only in a television station, in a portable moving picture recorder that records on computer-readable and writable random access recording media, such as a magnetic or optical disk. With such a combination, editing can be performed in the field at the same time as recording, providing an interaction between videography and editing in video production.

By providing a portable video recorder which records directly onto digital computer readable and writable random access (i.e., non-linear) medium, there is no longer a significant delay due to rewinding of the tape or for digitization of video tape for editing purposes. By further combining the advantages of non-linear recording and non-linear editing with non-linear broadcasting system and switching control, the time from videography to broadcast of an edited news event is drastically reduced. This reduction of the time from videography to broadcast provides a significant competitive advantage for broadcast news stations.

Accordingly, one aspect of the present invention is a digital moving picture recording and editing device in a portable housing. This device receives a motion video signal and converts the motion video signal to digital moving picture information. The digital moving picture information is then stored. The storage may be a computer-readable random-access medium. The digital moving picture information may be retrieved from the storage and displayed. An editing system allows for editing the stored digital video information.

Another aspect of the invention is a digital moving picture recording device. This device receives a motion video signal and converts the motion video signal to digital moving picture information. The digital moving picture information is then stored. The storage may be a computer-readable random access medium. The device includes a selector, selectable by a user, for causing fixed amount of video information to be stored in a loop for an indefinite period of time. The selector, or another similar selector, selectable by a user, allows for stopping recording of the loop and for continuing recording of video information. The recorded loop is appended to the beginning of the subsequently recorded video information. This aspect of the invention may be provided in combination with other aspects and embodiments of the invention.

In embodiments of the foregoing aspects of the invention, a video camera in the housing provides as an output the motion video signal.

The invention also applies to recording and/or editing of audio information. In one embodiment of the invention, video and/or audio data is processed as a stream of digital information the storage medium and various inputs and outputs. This processing uses a form of demand-based flow control to move data between a pixel bus and the storage medium.

In further embodiments of the invention, a user interface is provided which includes a display and associated input buttons. The editing system is responsive to operations of the input buttons to perform functions having corresponding displayed indications on the display.

In further embodiments of the invention, the editing system maintains an event list of events of an edited sequence. The event list may include events related to recorded clips and events related to other sources of video information. These other sources of video information include a video signal received from a camera.

In further embodiments of the invention, the editing system maintains a clip list of recorded clips stored on the means for storing. An outtake list may also be provided along with a means enabling an individual to move indications of clips recorded on the means for storing to the outtake list. The editing system may also maintain attribute information in the clip list allowing ranking of recorded clips. Clips having a given ranking may thus be selected and indications of these clips may be displayed.

In further embodiments of the invention, the editing system includes a graphical user interface that labels frames of a recorded and edited clip using symbols indicative of the status of each frame in an edited event. Alternatively, or in addition, the user interface may include a first user interface for allowing selection of recording operations to be performed and a second user interface for allowing selection of editing operations to be performed.

It should be understood that the invention relates to both the apparatus and devices described herein as well as the processes performed thereby.

BRIEF DESCRIPTION OF THE DRAWINGS

In the drawings,

FIGS. 10-32 are displays for display within the display area on FIG. 8 with indications of the function keys associated therewith, indicating the possible functions available in different modes of operation of the recording device.

DETAILED DESCRIPTION

The present invention will be more completely understood through the following detailed description which should be read in conjunction with the attached drawing in which similar reference numbers indicate similar structures.

A general description of the moving picture recording device is first provided in connection with FIGS. 1-7, including switching capabilities described in more detail in connection with FIGS. 4-7. Editing operations and user interface details are described in connection with FIGS. 8-32.

Figure 1:
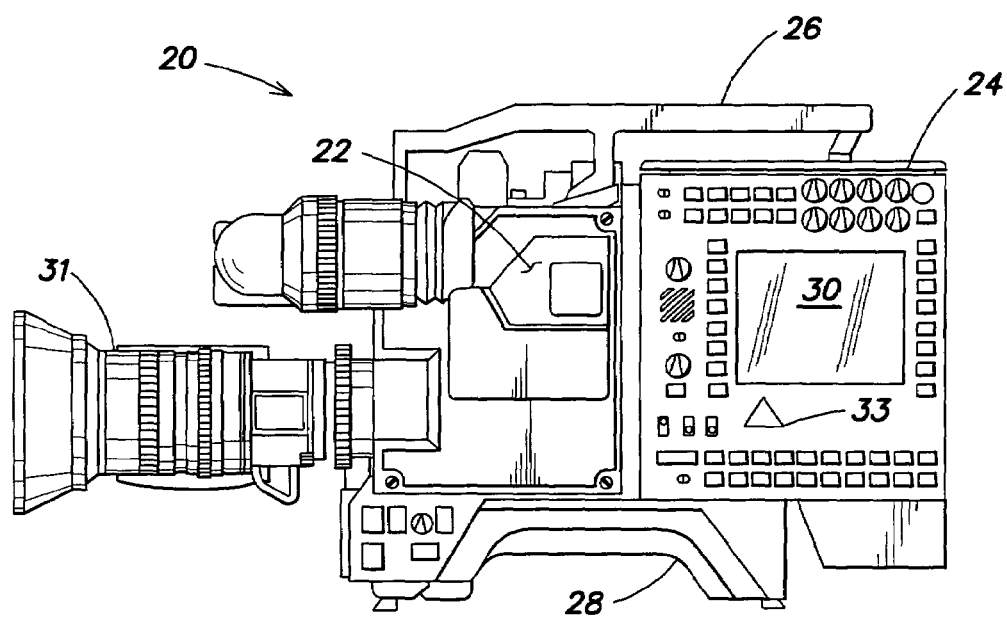
FIG. 1 is a left side view of a digital motion picture recorder affixed to a video camera in accordance with the present invention.

FIG. 1 shows a video camera/recorder 20 which includes a combination of a video camera 22 and a video recorder 24. The camera may be one of many types of video cameras, and may be, for example, either the HL-57 camera made by Ikegami Corporation of Japan, or the "400" camera made by the Sony Corporation of Japan. The video camera/recorder 20 also typically has a handle 26 and shoulder support 28. On the video recorder 24 of the device, typically a display 30 is used to provide the user status and other pertinent information to be detailed below. The camera, electronic circuitry (such as described below in connection with FIGS. 3-4) and recording medium may be in one piece, such that the camera 22 and recorder 24 are integrated, or may be in two pieces such that the camera 22 and recorder 24 are separable from each other. Many tape-based recorders used for news reporting are in such a two-part form, and often take the shape as shown in Japanese utility model 63-9907, also referred to as 56-134889, or Japanese patent 61-187165.

The output of the video camera is generally an analog video signal. Presently known cameras available from Ikegami have a 79-line bus for the purposes of communicating with a recorder, whereas Sony cameras use a 52-line bus. The recorder provides physical and electrical connections to interface with a standard bus such as the Ikegami, Sony or other bus, so that the motion picture recorder receives the output of the camera as if the recorder were a videocassette recorder. The motion picture recorder also includes, using techniques well known to those skilled in the art, electrical contacts and connections (not shown) to turn the camera on and off, initiate recording, etc.

Figure 2:
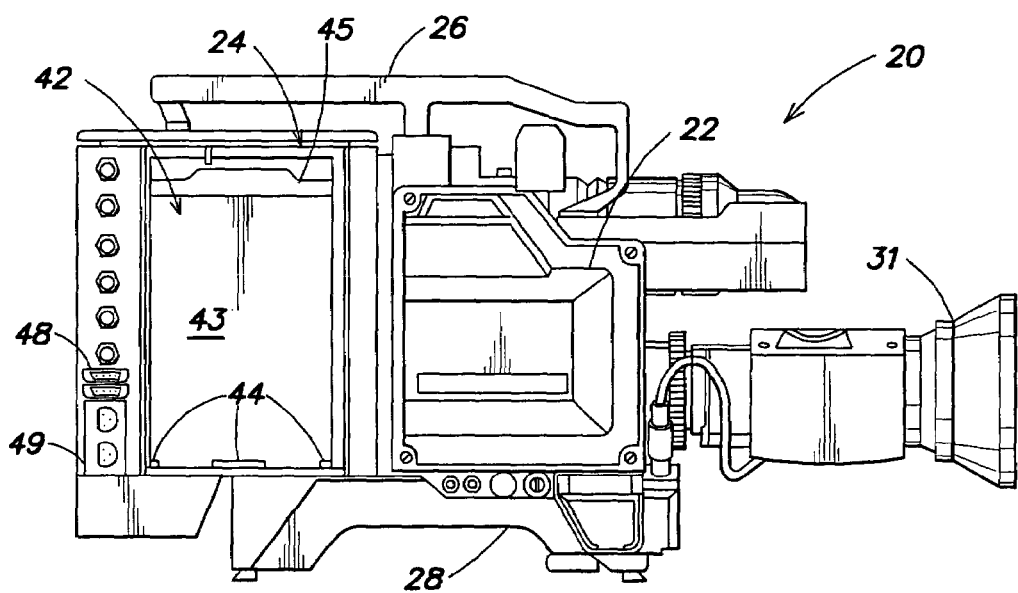
FIG. 2 is a right side view of the digital motion picture recorder of FIG. 1.

FIG. 2 shows the opposite side view of the camera shown in FIG. 1. On this side of the camera is found the recording media compartment 42 which is accessed via a door 43. External connections, such as 48 and 49, provide external video output, ETHERNET or other kinds of connections. The door 43 has a hinged section 44 and a handle 45 so that the door may be opened. The compartment 42 is an opening within the recorder and includes a connector (not shown) at the bottom of the compartment. Which receives a recording media package which connects to connector to provide electronic connection to the remainder of the circuitry of the recorder. The media package and connection to the recorder are described in more detail in U.S. patent application Ser. No. 08/392,536, filed Feb. 23, 1995 and a U.S. patent application Ser. No. 08/418,631 filed Apr. 7, 1995 which are hereby incorporated by reference.

Figure 3:
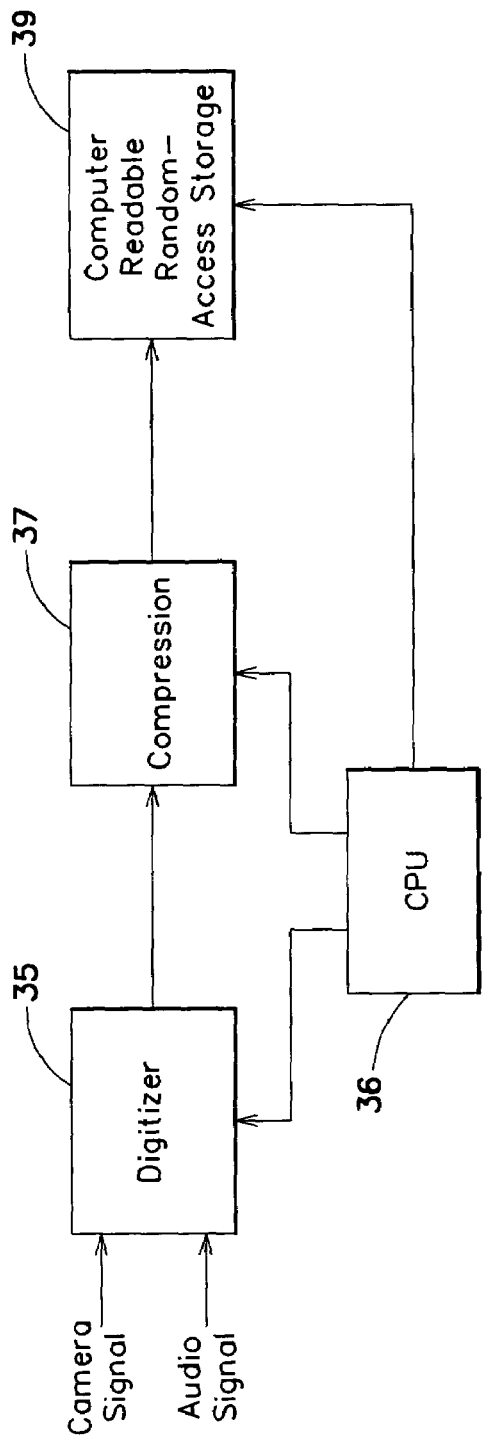
FIG. 3 is a block diagram of the electronic circuitry which processes the camera and audio signals into media files for storage on a computer readable and writable random access storage medium.

Having now described a general mechanical structure of an embodiment of the moving picture recorder, the electronic circuitry for processing the moving pictures will now be described. The output of the video camera 22, which is generally an analog signal, is provided to the digitizing electronic circuitry such as shown in FIGS. 3-9. Referring to FIG. 3, such circuitry generally includes a digitizer 35, compression circuitry 37, and a computer-readable and writable random-access recording medium 39, such as a disk drive, as described above. While the digitizer 35 is used for those video cameras which produce an analog output signal, the digitizer would be unnecessary if the output of the video camera were to be digital. In some prior art systems, the image captured by the camera 31 of FIG. 1 is impressed upon a charge coupled device (CCD), well known to those skilled in the art. The CCD produces an electrical signal, which is then processed (either digitally or with analog circuit) to create an analog video signal so that those signals may be passed to a conventional analog video cassette recorder. A digital video signal or a digital video information stream may be input directly to the compression circuitry 37 of FIG. 3, eliminating the digital-to-analog and analog-to-digital conversions associated with prior art devices from the circuitry within the camera 31.

However, to interface a recorder with presently existing analog output video cameras, the digitizer 35 is used. The digitizer may comprise a number of analog to digital (A/D) converters. These converters, well known to those skilled in the art, may accept the output of the analog video camera, and may comprise on A/D converter for each component Y, Cr and Cb signal from the video camera. Analog composite video may also be decoded into digital video data. Digital video may also be processed and synchronization signals may be removed to provide digital video information. A 4:2:2 format is typically used, but 4:1:1 and 4:4:4 formats may also be used. Other color formats may be used such as CMYK, HSI and RGB in 8, 16 or 32 bits formats. However, the Y, Cr, Cb format is preferable for use with the well known Joint Photographer's Expert Group (JPEG) compression standard, which may be used in this moving picture recorder. Other compression standards, well known in the art, such as MPEG, may also be suitable for use in the present invention. The video may also remain uncompressed. However, JPEG compression is useful for editing because it does not rely on differences between adjacent frames or fields, but instead each frame or fields is self-contained. Digitizing and compression/decompression circuitry is described in U.S Pat. Nos. 5,355,450, 5,045,940 and published Patent Cooperation Treaty (PCT) applications WO93/12481 and WO93/12613.

Audio signals are also processed and recorded. The audio signal is digitized from a microphone. Digitization is unnecessary if a digital audio source is used. Audio is generally not compressed.

One difference between the systems described in the above patents and published applications and one embodiment of the present invention is that this embodiment of the present invention does not require a frame grabber or frame buffer. The frame buffer is eliminated to reduce power consumption, which is desirable with a portable, battery-powered system. Its removal is possible by using a high throughput compression circuit such as the ZR36050 and ZR36015 JPEG compression circuits, available from Zoran of Santa Clara, Calif. These circuits provide full 60 field per second uncompressed data rates for 720×480 digital still images, which provides CCIR601 compliant broadcast quality images. Due to the high throughput compression circuit, the compression circuitry of this embodiment does not require any stalling or metering mechanism for delaying processing of data through this pipeline. Other circuits are available for JPEG compression, such as from LSI Logic.

In order to maintain correct color of the captured images from the video camera, the signals from the camera may be calibrated to match well known and established SMPTE digital video color standards. In the absence of such calibration, the compression circuitry of one embodiment of the invention, based on the well known and established JPEG compression standard, may create errors because JPEG compression relies on frequencies derived from the colors present in the signal. Calibration is done automatically in response to actuation of a calibration selection switch 33 on the video recorder of FIG. 1. Such calibration typically is performed both periodically during use and whenever a camera is associated with new calibration and digitizing circuitry.

Calibration is performed by causing the camera to generate a reference signal. A commonly-used reference signal is known as "color bars" or "test patterns." The test pattern for any given camera is in a predetermined format and is typically generated by the camera circuitry in a known manner. Using this format, the overall signal level of the color bar signal is determined by the recorder, and thus the values output by the camera and, by inference, the CCD device are determined. These values are then mapped to the SMPTE standard for digital color representations, of which an indication is stored in the recorder. More precisely, the A/D converters in the digitization process, described below, are adjusted so that the analog level output in the reference signal are translated to the corresponding SMPTE digital value. By creating this mapping in a deterministic way, the camera is thus forced into providing a SMPTE compliant digital video information. It is therefore no longer necessary to record a clip of color bars as is common with video tape. It may, nonetheless, be preferable to store a single frame of color bars digitally in connection with each recorded clip of compressed video.

These components shown in FIG. 3 as well as overall camera and recorder control operate under the control of a central processing unit (CPU) 36, such as the MC68341, available from Motorola, Inc., which runs under control of a real-time operating system such as the VXWorks operating system available from Wind River Systems of Alameda, Calif.

Management of media files and the disk controller may be performed by any number of known techniques, including that disclosed in U.S. Pat. No. 5,267,351, assigned to Avid Technology and as disclosed in published PCT application WO 93/21636. Data files are in the DOS-compliant file format, such as is available in the Real Time File System (RTFS) from etc bin systems of Groton, Mass. The RTFS file system is DOS compatible/re-entrant. This file system can be supplemented by a media file format known as the Open Media Framework (OMF), defined in the OMF Interchange Specifications available from Avid Technology and available in the OMF Interchange Toolkit, also available from Avid Technology. Management of lists of clips is described in more detail below in connection with the editing aspects of this system.

Figure 4:
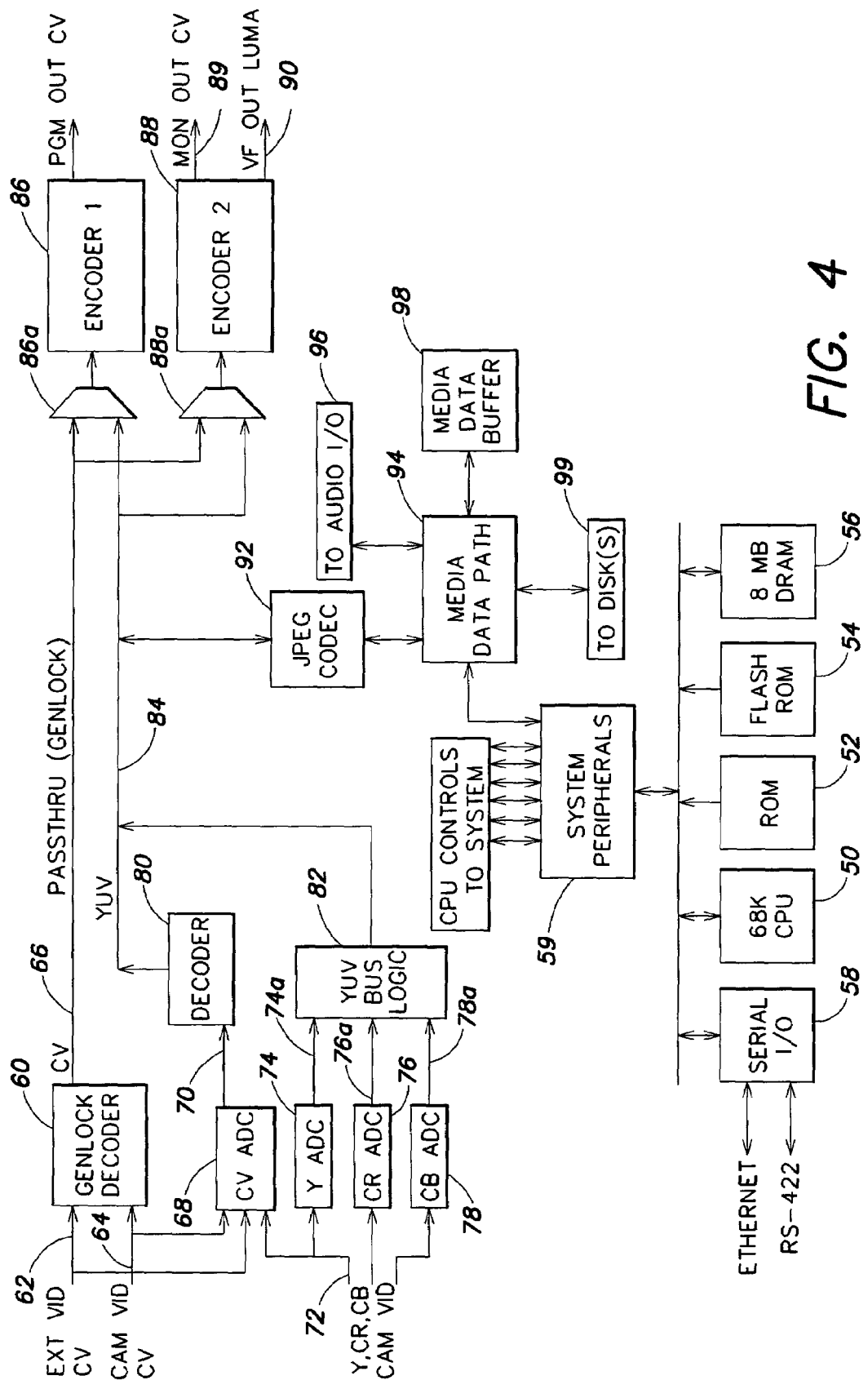
FIG. 4 is a more detailed block diagram of the block diagram of FIG. 3, illustrating switching paths.

FIG. 4 shows the circuitry of FIG. 3 in more detail. In particular, the circuit includes a genlock decoder 60 which receives a composite video signal either from an external video source on a first input 62 or from a camera video source through input 64 and outputs a digital composite video signal at 66. The external and camera composite video signals are also input to an analog-to-digital converter 68 to generate at an output 70 a digital composite video signal. Additionally, a component video signal, such as one comprised of luminance and chrominance components, is also received from a camera as an input as indicated at 72. The components are applied to analog-to-digital converters for each of the respective components as indicated in 74, 76 and 78. The output of these decoders, respectively, 74a, 76a and 78a provide a digital YUV digital component video information. A decoder 80 receives digital output from the composite video analog-to-digital converter 68 and generates a stream of digital video information, also in component form, typically YUV. The outputs of decoders 80 and component analog-to-digital converters 74-78 (via YUV bus logic 82) are both applied to what is herein called a pixel bus 84. The pixel bus 84 is used to transfer the YUV digital component information in this system. The composite video 66 and the YUV component information on pixel bus 84 are both applied to encoders 86 and 88 which provide output video signals. In particular, encoder 86 provides what is called a program out composite video signal, which is a broadcast quality CCIR 601 composite video signal. Encoder 88 provides an output composite video signal to a monitor as indicated at 89 and a luminance only output signal which is applied to a viewfinder, as described below. The composite video signal 66 and YUV digital video information on pixel bus 84 are illustrated as being applied to switches 86a and 88a which selectively apply one of the two inputs to their respective encoders 86 or 88. The switch is actually built into an integrated circuit which embodies the encoder, and hence the switches 36a and 88a are in FIG. 4 for illustration purposes only. They are not intended to signify multiplexers.

Also connected to the YUV pixel bus is a JPEG Codec 92. Although the described embodiment uses JPEG compression, this is not necessary and other types of video compression may be used. However, it has been found that, with a commercially-available Codec, full-motion broadcast quality images can be provided. Additionally, because each field is compressed using JPEG independently of other fields in video stream, editing of video is not hindered by the compression algorithm. The JPEG Codec 92 receives input from and outputs to the pixel bus 84. The JPEG Codec is connected to a media data path controller 94. The media data path controller 94 also receives audio information from the audio subsystem as indicated at 96. The audio subsystem is described in more detail below.

Tie media data path controller 94 controls compressed data flow between JPEG Codec 92 and the media data buffer 98. Additionally, it controls compressed data flow between the media data buffer 98 and media storage 100, which is typically a computer readable and writable random access recording medium, such as a magnetic disk or an optical disk. The entire system is controlled by a central processing unit 102. The control of the media data buffer 98 and CPU 102 is described, for example, in U.S. Pat. No. 5,045,940 and others as described above. The central processing unit has a bus 104 which connects it to a system peripheral controller 106 which provides control signals to the entire system. For example, it provides controls to the media data path 94, JPEG Codec 92, disk controllers for disk subsystem 100, the YUV bus logic 82, decoder 80, the genlock decoder 60 and the encoders 86 and 88. It is also connected to a read only memory 104 which is used to store control programs in the operating system for the CPU. A flash ROM 106 is also provided in addition to some volatile memory such as dynamic random access memory as shown in 108. Finally, a serial I/O controller 110 may be used to provide either an ETHERNET or RS-422 connection to other computers or other equipment.

A more detailed block diagram of the circuitry shown in FIGS. 3 and 4 will now be described in connection with FIG. 5. As described above, the digitizing circuitry is controlled by a central processing unit 100, such as the Motorola MC68341 processor, running a real-time operating control system. The central processing unit 100 has a main address and data bus 102 to which other parts of the system are connected.

Digitizing circuitry includes a GENLOCK circuit 104, which processes composite video signals, and a set of analog-to-digital converters 106, associated with a synchronization signal stripping circuit 108, which processes component video signals into a YUV 4:2:2 format digital signal. The composite video signal output by the GENLOCK circuit 104 is provided to a decoder 110, which converts it into a digital component information, similar to that output by the analog-to-digital converters 106. The horizontal synchronization signal (HSYNC), vertical synchronization signal (VSYNC), and the pixel clock (PIX) are used to synchronize the rest of the circuit. The composite signal is provided along a bus 109 to a decoder 110 which translates it into a YUV 4:2:2 digital component signal. The composite signal is also directed to encoder 152.

The component digital signals are applied to a pixel bus 112 which directs them through a switch 114, such as a multiplexer, to a raster block converter 116 and memory 118, which generates picture blocks from the serial pixel data for use and processing according to the JPEG compression standard described above. The memory 118 typically has a size of 32K×16. The transfer of pixel data to the raster block converter 116 bypasses the central processing unit (CPU) 100, i.e., pixel data is not written to the CPU's main memory 105. A JPEG processor 120 interacts with the raster block converter 116 and memory 118 to take a digital still image obtained from the pixel data and compresses it using the JPEG compression standard to provide an output as indicated at 122. The JPEG compression standard may be adaptive to provide improved image quality while maintaining good compression levels in accordance with the teachings of U.S. Pat. No. 5,355,450.

As to audio signals inputted, a microphone or line-in signal indicated at 130 is applied to one or more audio coders and decoders (CODEC) 132 which provide a serial digital output 134. The coders are not necessary if the input signal is digital, such as from a digital microphone, digital audio tape, compact disc or other digital source, or if the output signal is digital. The sampling rate may be any desired rate, but typical rates for audio include 44.1 KHz, 22 KHz and 48 KHz. 8, 16 or 32-bit formats may be used, among other. It should be understood that the invention is not limited to any particular digital audio format. Additionally, they may receive digital input via the bus 136 to convert them to analog output signals at 138. The serial audio data 134 and the compressed video data 122 are applied to a pipeline control circuit 124. The pipeline control circuit 124 is controlled using synchronization control information from a synchronization controller 126 to direct the data into a data buffer 128 typically implemented as a dynamic RAM. A suitable size for this buffer is 2M×32 and it is typically implemented logically as a ring buffer. The pipeline control circuit is implemented in accordance with the teachings of U.S. Pat. No. 5,045,940 and PCT publication WO 93/12481. The CPU 100 controls synchronization controller 126, pipeline control circuit 124 and disk controllers 140 to direct the flow of the video and audio data between memory 128 and the disk storage 142. Two disk controllers are used for performing conventional striping. However, one controller may be used to send commands to circuitry on the drive package which may divide an incoming stream or combine an outgoing stream of data in response to commands from a single disk controller 100. Striping may be performed at the word level, or at block or byte levels. The disk controllers and associated bus to the disk may be a standard disk controller, such as IDE or SCSI controllers. It should be understood that the invention is not limited to the type of disk controller.

The pipeline controller provides a form of local synchronization using demand-based flow control of the media data between the encoders and decoders and the computer-readable storage. The movement of data on the pixel bus is through the compressed data buffer and to the storage is intermittent, but has an average flow that is comparable to the continuous, synchronized flow of a video signal. This flow control accommodates for statistical variations in flow due to disk accesses, memory management and other impact on the flow due to the other operating system activities. The flow control ensures that an encoder receives data when the data is needed and that data is read from a decoder without being dropped. An additional benefit of using flow-controlled media data is that no pre-roll time is needed to lock to an incoming source or to lock to an output frequency and phase.

This system may also be provided with the capability of providing an output video signal generated from the digitized video signal. For example, the pixel bus 112 may be connected to an overlay circuit 150. The output of the overlay circuit 150 and the composite signal 109 may be provided to an encoder 152. The output of the encoder may be provided back to the camera which has an input for the view finder 154. Additionally, this signal may be provided to monitor output 156. In one embodiment of the invention, the camera's view finder 154 receives a signal not only from the camera, but also from an alternate source. Using this capability, the moving picture recorder may have a controller 158 and an associated memory 160 which may provide additional status information via the view finder in connection with the video being recorded. Such status information may be an indication of battery level, time codes, time. of day, function performed (e.g., recording or playback), etc. The central processing unit 100 also has associated with it a programmable read-only memory, such as a flash memory 101 in which program information is stored and a dynamic RAM controller 103 and dynamic RAM 105, which are common in the art, for storing volatile data while processing. Typically the memory 101 contains an operating system and other programming code which is kept in non-volatile storage. A suitable size for this memory 101 is 4M. A suitable DRAM size is 4M×16.

In one embodiment, the moving picture recorder has an additional encoder 162 which provides a composite-out video signal with VITC/LTC control information. The input to the encoder may be any one of the pixel bus 112, the output of decoder 110, bypassing pixel bus 112, the output of A/D converters 106, bypassing pixel bus 112 or the output 109 of genlock circuit 104. Alternatively, each of these inputs may be applied to its own separate encoder. The outputs of these encoders may be fed to a simple switch allowing for the selection of one of these outputs. Additionally, an ETHERNET connection 164 may also be provided.

In one embodiment of the invention, two pixels buses 112 may be used. The first bus is the record bus which connects to the outputs of the decoders 110 and 106, and to the inputs of the JPEG compression circuitry via the input side of switch 114 and the encoders 162 and 152. The second bus is the playback bus which connects to the output of the JPEG decompression circuitry, via the output side of switch 114, and the inputs of encoders 162 and 152.

In one embodiment of this invention, the GENLOCK circuit 104 may be a Raytheon 22071 GENLOCK circuit. The decoder 110 may be a Raytheon SAA7151 decoder. The encoders 152 and 162 may also be either a Raytheon or TRW 22191 fill video encoder. The ETHERNET circuit, audio modules and disk controller are available in a variety of forms and are available from a number of suppliers.

Figure 5:
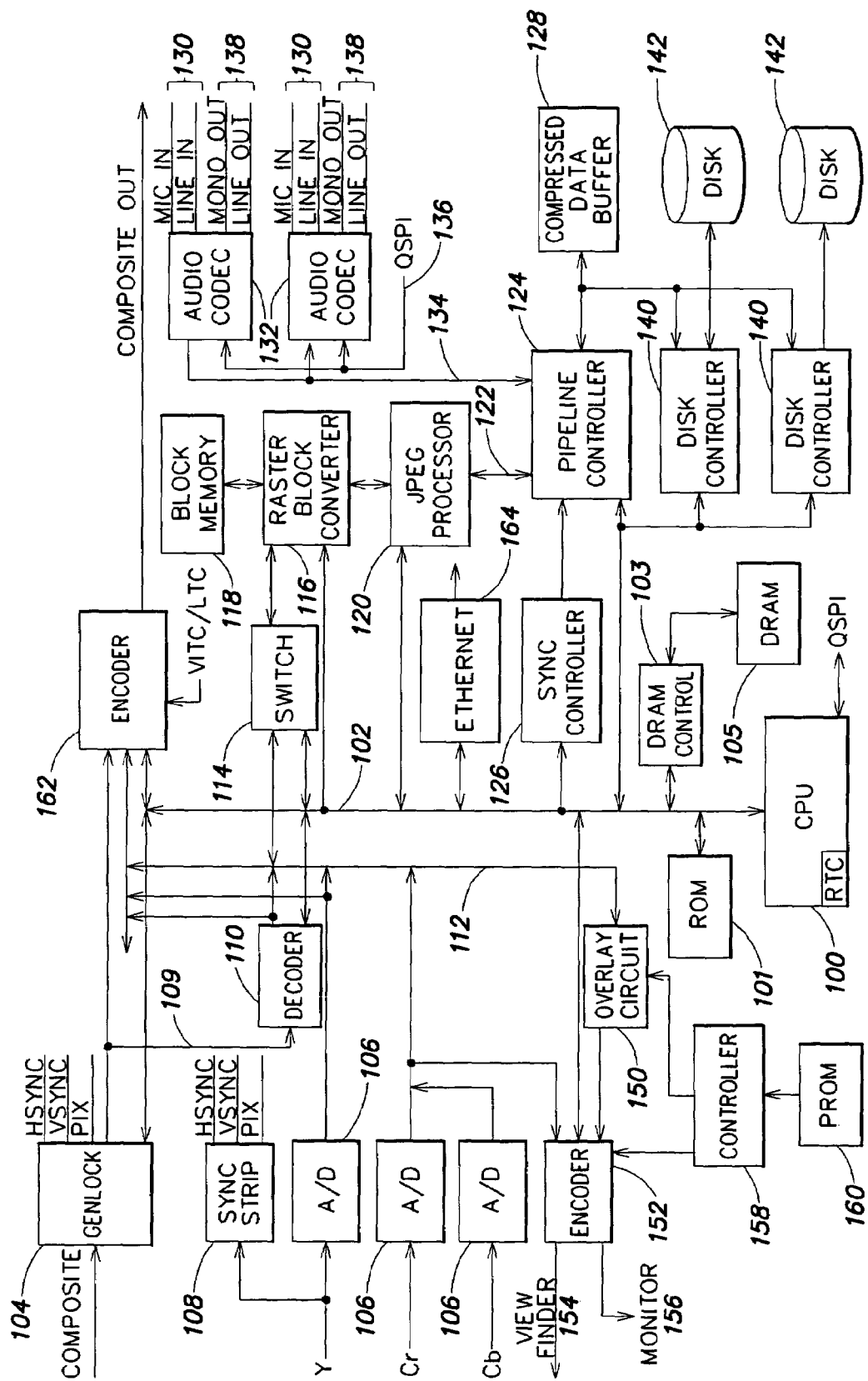
FIG. 5 is a more detailed block diagram of the circuit illustrated in FIG. 4.
Figure 6:
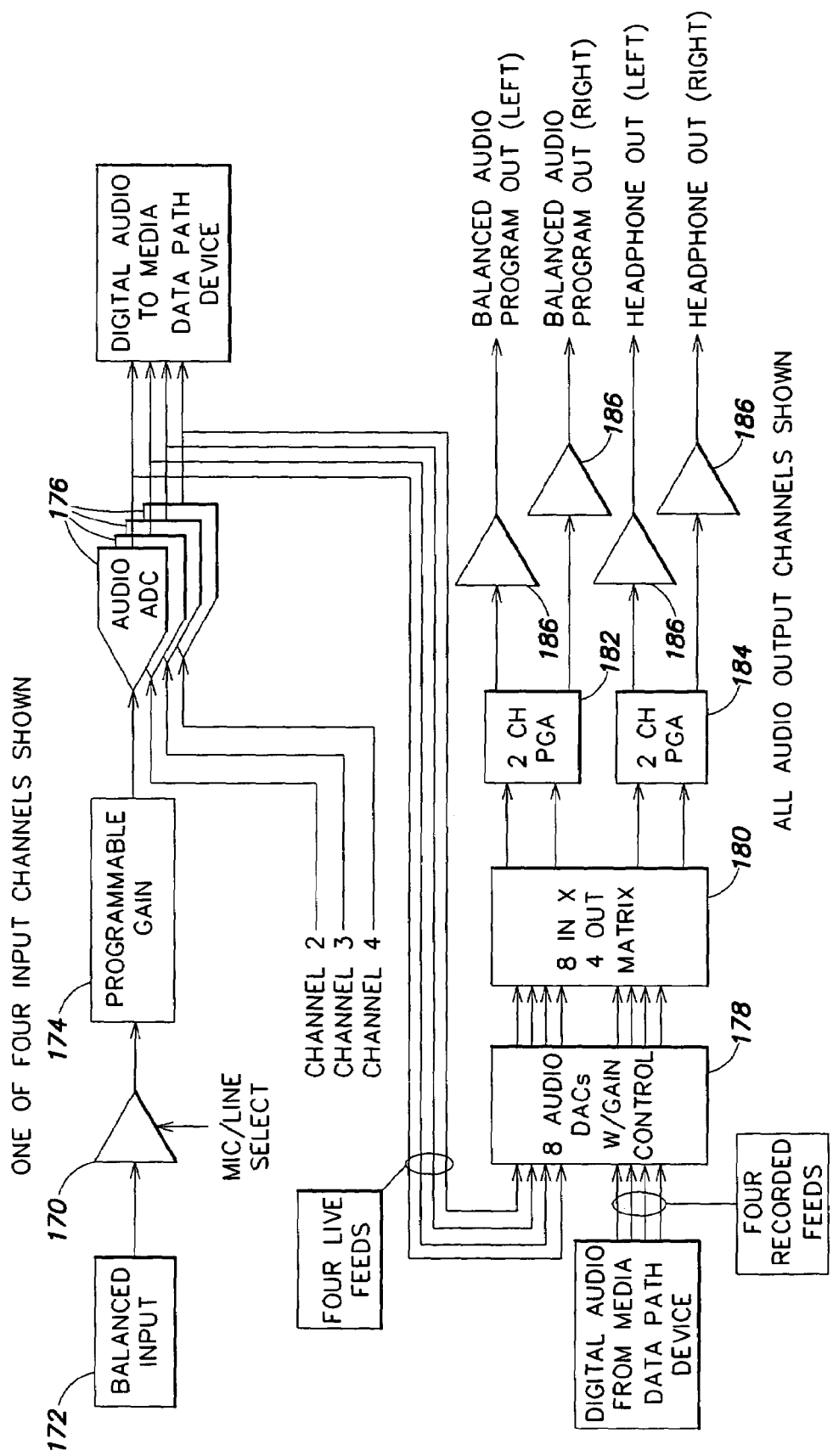
FIG. 6 illustrates audio signal paths.

FIG. 6 describes in more detail the audio subsystem, such as shown at the audio Codecs 132 in FIG. 5. There are generally four input channels and four output channels: left and right microphone inputs and left and right line inputs, and left and right balanced audio program out and left and right headphone out. Each audio channel is provided with a selector 170 which selects between microphone and line level inputs, according to the input 172 (which may be balanced) that it expects to receive. A programmable gain amplifier 174 is also provided on each channel. Each audio channel also has a corresponding audio analog-to-digital converter 176 which receives the audio input signal and converts it to a digital signal. The outputs of the analog-to-digital converters 176 are digital audio which are applied to the media data path device, such as indicate as the pipeline controller 124 or media data path device 94 in FIG. 4. These digital signals are then fed to digital-to-analog converters with gain control as indicated at 178. Digital-to-analog converters 178 receive eight inputs: the digital signals from the digital audio from the media path device (four recorded feeds) and the digital outputs of the analog-to-digital converters 176 (four live feeds). Digital-to-analog converters 178 provide eight outputs to an 8-in by 4-out matrix 180 which selects from the 8-input and provides the 4 audio outputs. These four audio outputs are fed to, in pairs, a two-channel programmable gain amplifier 182, 184. These are then fed to a microphone or line select device 186 to in turn provide either balanced audio program-out or headphone-out. The analog-to-digital and digital-to-analog converters may be implemented with a Crystal Semiconductor 4225 coder/decoder. The 8-4 switching matrix is an analog switch such as a MAX 335 available from MAXIM.

In another embodiment, a warning tone generating circuit is provided which is selectively applied to either the program-out or headphone circuitry. Additionally, a speaker on the camera may be connected to play the program-out audio.

Control of the amplifiers and switches is provided by computer programming in a control program on the CPU. This communication is done over what is indicated as a QSPI bus in FIG. 5. In particular, for the variety of possible modes of the system, the computer has corresponding output signals which are set when a given mode is selected by the camera user.

Figure 7:
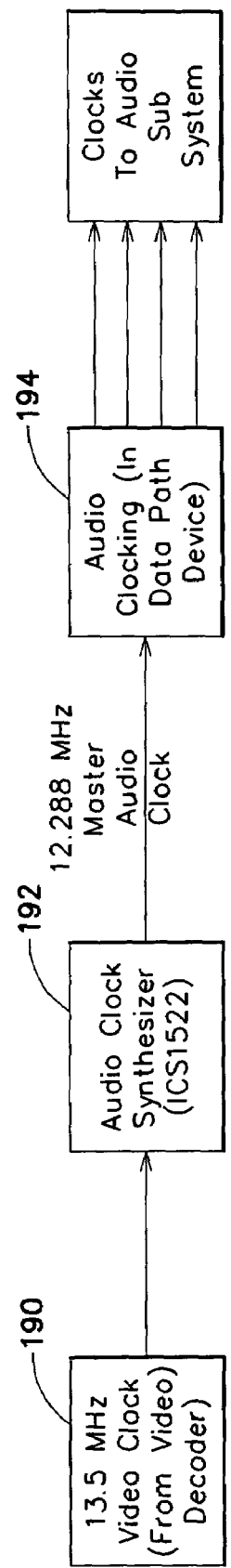
FIG. 7 illustrates synchronization circuitry for the audio and video paths.

Synchronization of the playback of video and audio through the program-out channels will now be described in FIG. 7. The synchronization is performed by creating a video clock from a video decoder, such as a 13.5 MHz clock as indicated at 190. An audio clock synthesizer, such as a Crystal Semiconductor CS1522 audio clock synthesizer, as indicated at 192, receives the video clock from the video decoder and generates a master audio clock, such as a 12.288 MHz clock. This master audio clock is then provided to an audio clocking system 194 in the media data path device which generates a plurality of clocks to the audio subsystem.

Having now described the general structure and operation of the digital moving picture recording device, operations for editing will now be described. As discussed above, recording and editing of clips is managed by a computer program. running on the main processor of the recorder. An editing system may be implemented to perform functions commonly performed by current computerized video editing systems, such as the Avid/1 Media Composer and NewsCutter from Avid Technology of Tewksbury, Mass. These functions are implemented so as to be operative in response to keypad input as described below.

There are three kinds of lists which are used to maintain and manage instances of recorded clips. A user interface is provided (discussed below in connection with FIG. 15) with numerous input buttons and a display to allow a user to select functions to be performed. Each of these functions manipulates one of the lists used to manage the clips on the recording device. The lists are described first, followed by a description of the user interface and functions to be performed.

The recorder uses three kinds of lists to maintain proper overall organization of recording and sequencing activities. In particular, it maintains what is called herein a "clip list" which indicates currently available and active recorded clips. A clip list is provided for a currently active bin. There may be a plurality of bins stored in the system, and thus a clip list is maintained for each bin. Any clip may be moved from and to the different bins. Another list, called herein an "outtake list," is a list of clips which the videographer has indicated as rejectable. Clips in this list are moved to it from the clip list by the videographer in a manner described below. The clip list and outtake list thus include the available clips or outtakes and are automatically organized in ascending clip order. That is, each clip as it is recorded is assigned a number. This number is incremented for each recorded clip. It is assigned to the clip regardless of weather the clip remains in the clip list or in the outtake list.

A third list, called herein a "sequence play list," is a programmable list of events. An event may hold information for playing a clip, or an event may control a switch to a specific video source. This programmable list is played back to the program video output. The sources available for events in the sequence play list are the camera, external video, black, or a test signal, as well as clips recorded on the disk. The disk source is automatically selected whenever a clip is playing. Thus, the sequence play list also includes live or recorded video and audio clip tracks. Audio track assignments may be individually selected for each event and include left, right or both line audio output channels.

A sample clip list is found in Table I below. In this clip list, mark in and mark out points are indicated by underlined time codes. The start and end time codes for each clip is also provided as well as its length. In this example, some clips have been deleted to the outtake bin (illustrated in Table II).

TABLE I

| CLIP | Start | Mark IN | Mark OUT | End | Length |
|---|---|---|---|---|---|
| 0017 | 02:00:00:00 | 02:00:03:17 | 02:00:21:14 | 02:00:23:21 | 0:17:27 |
| 0018 | 02:00:23:22 | | | 02:00:49:02 | 0:22:20 |
| 0022 | 02:03:35:22 | | | 02:03:57:22 | 0:22:00 |
| 0023 | 02:03:57:23 | 02:04:01:12 | 02:04:17:17 | 02:04:24:00 | 0:16:05 |
| 0024 | 02:04:24:01 | 02:04:31:19 | 02:04:38:22 | 02:04:40:17 | 0:07:03 |
| 0025 | 02:04:40:18 | 02:04:45:03 | 02:04:53:23 | 02:05:07:03 | 0:08:20 |
| 0026 | 02:05:07:04 | 02:05:11:20 | | 02:05:22:05 | 0:10:15 |
| 0029 | 02:07:07:08 | | | 02:08:10:14 | 1:03:06 |

TABLE I-continued

| CLIP | Start | Mark IN | Mark OUT | End | Length |
|---|---|---|---|---|---|
| 0030 | 02:08:10:15 | 02:08:15:23 | | 02:09:19:27 | 1:04:04 |
| 0031 | 02:09:19:28 | 02:09:25:02 | 02:10:22:18 | 02:10:30:29 | 0:57:16 |
| 0032 | 02:10:31:00 | 02:10:44:03 | 02:11:47:15 | 02:11:52:06 | 1:03:12 |
| 0033 | 02:11:52:07 | 02:11:57:08 | | 02:12:18:10 | 0:21:02 |
| 0034 | 02:12:18:11 | 02:12:21:22 | 02:12:38:07 | 02:12:40:27 | 0:16:15 |
| 0035 | 02:12:40:28 | 02:12:41:18 | 02:12:59:21 | 02:13:03:02 | 0:18:03 |
| 0036 | 02:13:03:03 | | | | |

TABLE II

| CLIP | Start | Mark IN | Mark OUT | End | Length |
|---|---|---|---|---|---|
| 0019 | 02:00:49:03 | | | 02:02:59:07 | 2:10:04 |
| 0020 | 02:02:59:08 | | | 02:03:20:15 | 0:21:07 |
| 0021 | 02:03:20:16 | | | 02:03:35:21 | 0:15:05 |
| 0027 | 02:05:22:06 | | | 02:06:13:14 | 0:51:08 |
| 0028 | 02:06:13:15 | | | 02:07:07:07 | 0:53:22 |

A sample sequence play list is shown in Table III. Each event is assigned a number, and indicates a source as well as tracks which are controlled by it. If there are attributes (textual or numerical) assigned to clips, these are also indicated in a name/data field. In the source field, the use of a number indicates a clip in an available bin. A duration of a clip is also indicated. The tracks indicate one video channel and five audio channels. The first character thus indicates either a test signal, such as may be read from disk, black, or camera, there is also the possibility to provide an external video signal which could be signified by an "X". The second field may indicate a microphone input to be directed to the output. Finally, the last four fields indicate which audio track should be used. It is possible, for example, to use the audio track from one clip and the video from another as indicated in event 5 is this play list.

TABLE III

| EVENT | SOURCE | TRACKS | NAME/DATA |
|---|---|---|---|
| 01 | TEST | V-TONE | |
| 02 | BLACK | B----- | |
| 03 | CAMERA | CM---- | |
| >04 | 0027:16 | V-1--- | VICTIMS |
| 05 | 0030:04 | VM--34 | WILDFIRE |
| | 0017:04 | ---2-- | VOICE |
| 06 | | ---- | |
| 07 | | ---- | |
| 08 | | ---- | |
| 09 | | ---- | |

Time displays in this system are based on standard SMPTE time code, which can be used in any of the typical SMPTE modes. Values can be preset. Use of a time display in this form permits logging by the videographer for later reference as part of a typical journal of production notes. This time location can also be used in a character overlay to display the time location of a current freeze frame, for example. During recording, a running time value may be shown.

A clip is the result of any one cycle of recording and may include video information, audio information, or both. The frame is digitized and stored between the time when record mode (digitizing) begins and ends as a clip. When recording stops, each clip automatically receives a unique identifying number. The clip counter is advanced by one every time a new clip is recorded. Like the time values, the clip counter may be preset to a desired value for recording. Clip numbers may be used for navigating and locating a clip. Also, a current clip value may be displayed along with time value on a monitor output character overlay. Clips may also be assigned a mark in and mark out points using the editing features described below.

An event contains mark in and mark out locations and track playback assignments for a clip. An event may also control the program out to select any source, such as the camera, external video, black, or test. By allowing the clips to be assigned or inserted into any event, this feature supports split "L" cuts, narration. of music to pictures, etc. Events may be navigated, reviewed and trimmed in the same manner as clips, using the editing features described in more detail below.

The user interface for the system will now be described in connection with FIGS. 8 and 9. The control interface is divided into three levels of operation. The first level of operation is basic motion control which include most basic and familiar functions commonly associated with video tape systems. Most of these commands are supported by real-time dedicated keys on the display, as described below. Generally speaking, the dedicated keys are assigned to functions that must be quickly and easily accessible most or all of the time to the videographer. The dedicated control keys may be organized into function groups on the interface. The second level of operation is referred to herein as "advanced transactions," for which real-time adaptive keys are assigned. These advanced transactions include tasks associated with numeric media navigation and sequence management. These adaptive keys provide functions, generally speaking, which are geared to simplify and streamline routine transactions and to speed up sequence building operations. These adaptive keys are described in more detail below. The third level of operation is provided for a system set up tasks, diagnostics, and those functions that are not frequently or routinely used in the course of an average production day. This level of control is accessed through a series of menu pages on a display. The menu pages are defined by data stored in memory and accessed according to the state or mode of operation of the camera.

Figure 8:
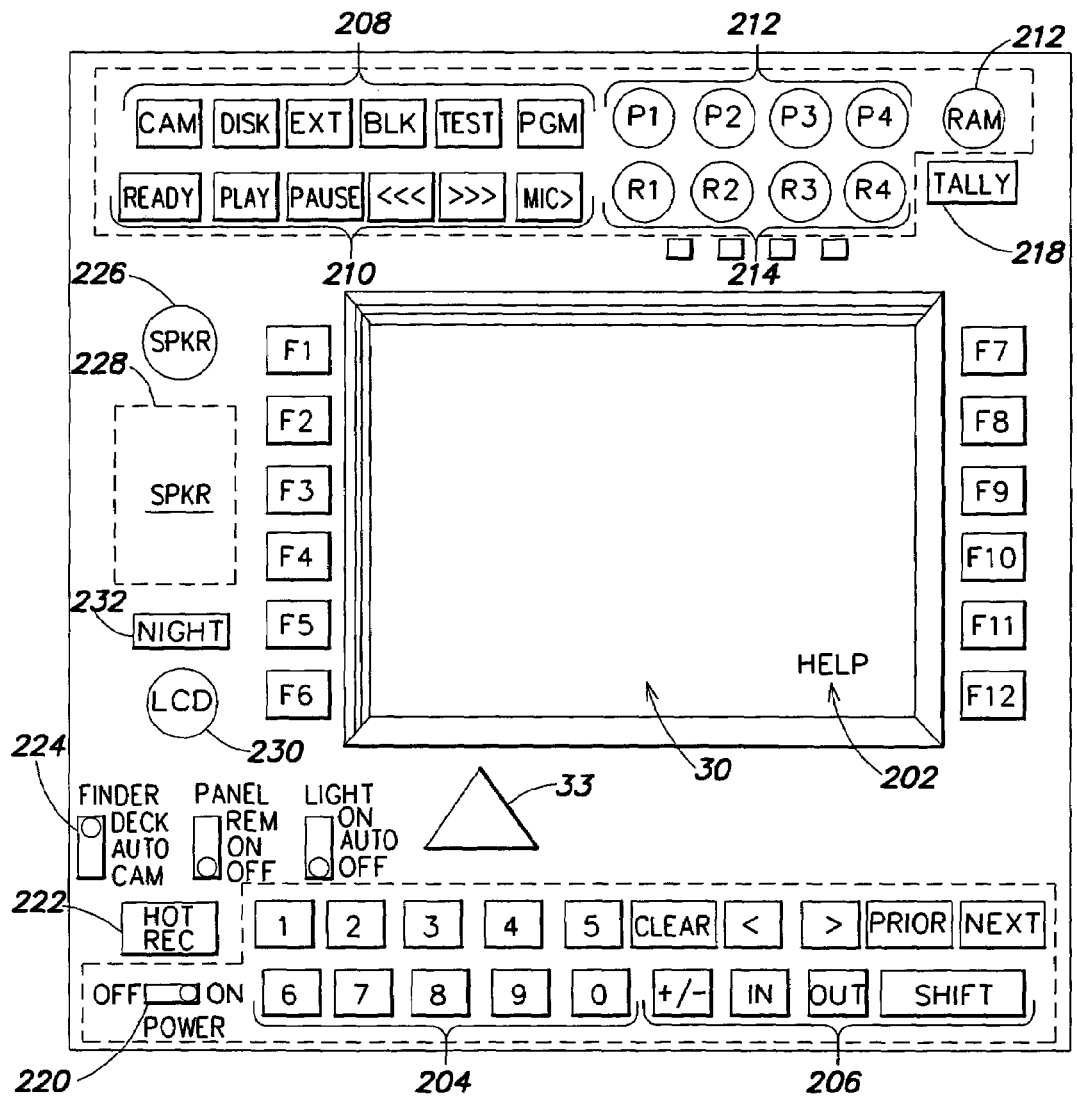
FIG. 8 is a diagram of a user interface on the side of the camera such as shown in FIG. 1.
Figure 9:
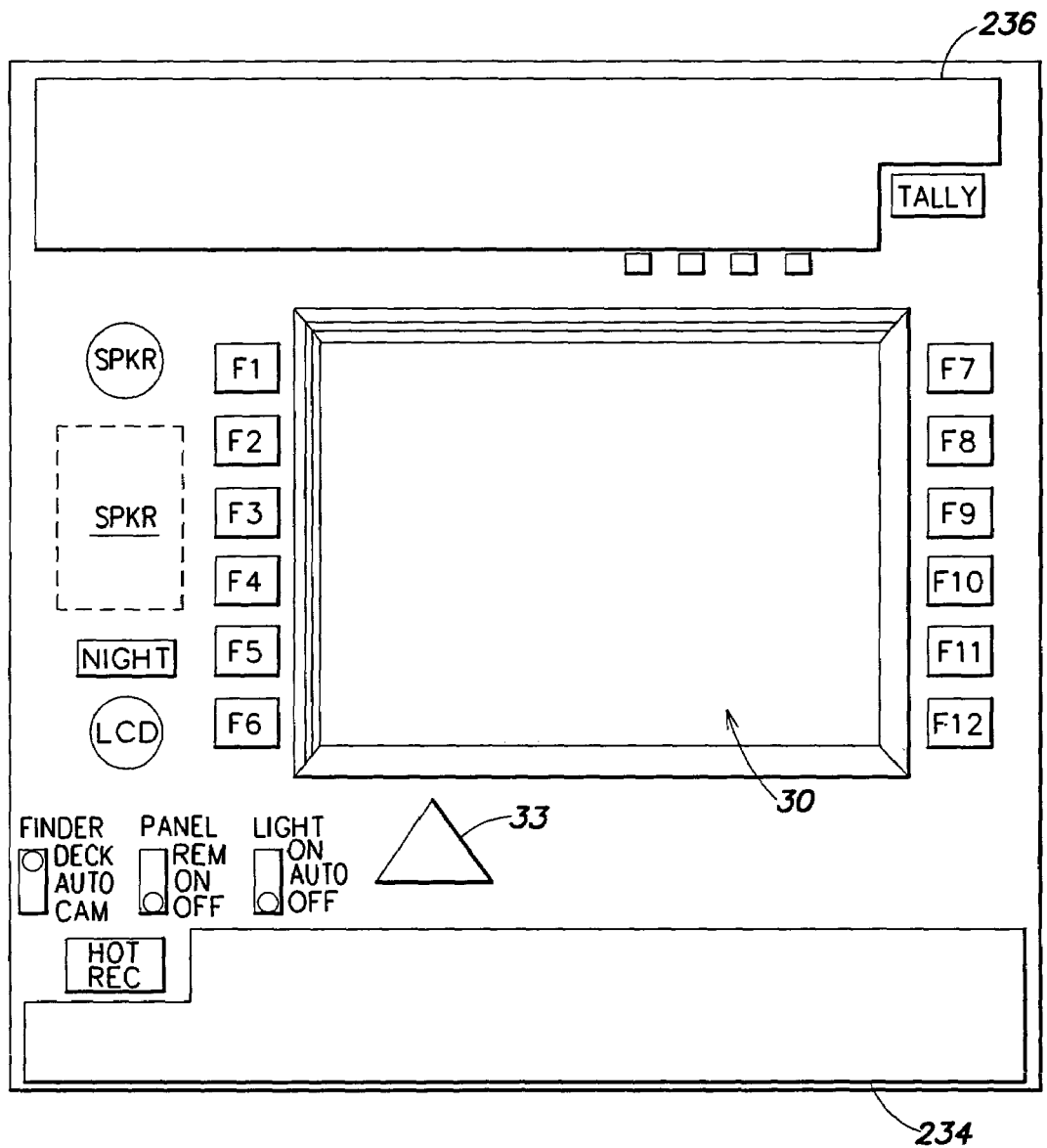
FIG. 9 is the user interface of FIG. 8 showing covers over buttons in that display interface.

Referring now to FIG. 8, the user interface includes a display 200 which provides a textual output to the user, for example through a liquid crystal display. Associated with display 200 are function keys F1-F12. A caption, such as the word "HELP" as indicated at 202, is displayed on display 200 adjacent to each of the function keys. The caption displayed adjacent each key indicates the function that the key is currently programmed to operate. The different screens and the functionality provided thereby are described in more detail below. The dedicated keys include a numeric entry keypad 204 which includes keys with the numbers 0-9. The display also includes navigational controls 206. These nine keys herein are indicated as: "Clear", "<", ">", "Prior", "Next", "+/−", "In", "Out", and "Shift". Program switching controls are provided by six keys indicated to 208. These keys control recording and playback as well as the source to the program output, such as camera, external, test, etc. Six other keys are provided for transport control as indicated at 110. Audio playback level controls are provided at 212 and audio input levels controls are provided at 214. The interface may also include a RAM button 216, tally button 218, power switch 220, a HotRec button 222. Three other switches may be provided as indicated at 224, for controlling the finder, panel and light. Outputs may also be provided at a speaker 226 and 228, an LCD 230 and a Night control button 232. Covers 234 and 236 may be provided over the dedicated keys, such as shown in FIG. 9.

The functions provided by these buttons will now be described in more detail.

In this embodiment of the invention there are two primary display pages which provide the basis of routine operations. One of these pages is selected by the user as a home page. Depressing of the "clear" key returns the system to the home page after other operations have been completed. A third page is accessible from either of these two pages to provide access for a system set-up tasks, adjustments, and diagnostic functions.

One of the primary display pages, a recorder display, is illustrated in FIG. 10. The adaptive key motion controls F1-F5 are identical in operation to similar dedicated keys located above the display shown in FIG. 8. The amount of power available to continue recording and editing material is indicated at "BATT" in the display, along with the associated remaining available time for recording clips. Current clip and time display is located next to the play control at F5. A similar overlay may be presented on the video monitor output signal. This signal may be switched, between a monitor and the camera viewfinder. There are bar graph audio level indicators for audio tracks 1-14 displayed next to the F7 and F8 keys. These are aligned with the recording level controls for each track as controlled by recording level button controls 214. The programmable playback assignments for each track are shown below the level bar graphs. The current clip and time display, next to the play control button, includes a time line locator display, which is a two-character display representing a current frame. It provides an indicator of marks and verifies clip boundaries and Mark IN and Mark OUT frames. It operates as an extension of the time display and is found in both the recorder display and the sequencer display to be described below. Timeline locator symbols are indicated in Table IV. These four symbols are exemplary, other symbols could be used, however, it has been determined that the symbols listed in Table IV provide more intuitive combinations of symbol pairs for communicating the status of a given frame. Symbol pairs form timeline locators for each frame.

TABLE IV

| | |
|---|---|
| \| | CLIP boundary. The first or last frame. |
| > | Marked frames exist following this point. |
| < | Marked frames exist preceding this point. |
| = | This point is within the marked frames. |

The table of assignments of these pairs to timeline locators are shown in Table V.

TABLE V

| | |
|---|---|
| \|= | First frame of an Unmarked CLIP |
| \|> | First frame of a Marked CLIP |
| >> | Frames preceding Mark IN |
| >= | The Mark IN frame |
| == | Frames between the Mark IN/OUT |
| =< | The Mark OUT Frame |
| << | Frames following the Mark OUT |
| <\| | Last frame of a Marked CLIP |
| =\| | Last frame of an Unmarked CLIP |
| >< | Both IN/OUT marks indicate a freeze frame. |
| -- | PLAY or SCAN motion disables this display. |

Examples of how each frame in a timeline is defined by these two characters is provided by the examples of Table VI, wherein each frame is defined by 2 characters in the timeline.

Example D indicates a clip right after recording, with no marks.

TABLE VI

```
A. 01 02 03 04 05 06 07 08 09 10 11 12 13 14 15 16 17 18 (Frames)
   |> >> >> >= == == == == == == == =< << << << << << <|
               MI                              MO
B. |>>>>>>>======================<<<<<<<<<<<|
         MI                    MO
C. |>>>>>>>>>>>=============================|
         MI
D. |========================================|
```

In the sequencer mode, the display is such as shown in FIG. 11. In FIG. 11, the example shows the recorder in the state where a freeze frame of the last recording device is currently available. In the sequencer mode, there are several modes for numeric navigation. They are referred to by function keys 1-4 and 12. Pressing any of these function keys sets the command line to the selected mode, where the command line is indicated at 240. The command line presenting numeric entry field formatted for each mode. When any mode is selected the numeric field displays the current freeze frame location value. Touching any numbers on the keypad below instantly and automatically clears the numeric field of the current location value and displays new numbers as they are entered. Numeric input enters from the right and parades left with successive keystrokes. The clear key is used to clear the field. The F5 function key changes from "play-pause" to "GOTO" any time a numeric field value is changed. Thus, the GOTO option is presented any time any new numbers are entered. The formatted numeric fields for the various modes are described below in Table VII.

TABLE VII

| | | |
|---|---|---|
| TIME ..:..:..:.. | | |
| CLIP .... CLIPTITLE | :00 | V-1234 |
| EVENT .. = 0000 | :00 | VM1234 |
| PAGE .. | | |
| OUTTAKE .... | :00 | V-1234 |

The clip mode will now be described, which is entered by pressing the F2 function key in the sequencing mode. This mode may the default mode for the sequencer and recorder. The clip mode may be generally asserted after a TIMEOUT period, after recording after editing events or after depression of the clear key.

The upper portion of the display in the sequencer mode in FIG. 11 is dedicated to clip and time navigation activities in sequence building. The F1 function key is assigned to "time" and the F2 function key is assigned to "clip" and includes corresponding displays on the left and on the overlay on the monitor OUT video signal. These displays indicate the system's current location. There are two clip values (0017/0035) located just to the right of the current clip display. These indicate the lowest and highest clip numbers available, i.e., the range of clips present on the currently attached disk or other recording medium.

Basic sequence building functions are available on the right hand side of the display, namely DELETE and INSERT which are operated respectively by the F7 and F8 function keys. By pressing either the F1 or F2 function keys, numeric input is received to bring the system to a current location which then may be acted upon using either DELETE or INSERT, or other keys such as described in more detail below.

The command line 240 (line 4) is at the base of this area just below the clip display. The command line displays the current state or mode of operation, i.e., either time, clip, outtake, event or sequence. GOTO and play controls, provided by the F5 function key respond to the displayed command line mode and its numeric field value.

In the clip mode, the command line displays an indication of a clip, its duration and recorded tracks. In the event mode, the command line displays the event and its associated clips in similar fashion. Because navigation and sequencing activities typically involve managing the relationships between clips and events, the command line is situated between the current clip display and the event window. When first selecting or defaulting to the clip mode, the command line and the clip display agree. When first selecting the event mode, the lower of the two events displayed in the event window and the command line agree.

When selected, the time, page, and outtake modes also appear on a command line in the same manner. Thus, the command line provides an indication of the current mode and manages numeric input field for navigation. Together, the command line and the numeric field input work together to provide a system that offers straightforward operating simplicity and speed of a common calculator. As each transaction progresses, some function key captions are updated. This provides an appropriate controlled universe of choices. Appropriate functions and operators are presented as needed. This limited interface technique simplifies the overall screen presentation.

In the center of the sequencer display is the event display area between the F3 and F9 function keys. The event display is a scrolling window that shows two events in the sequence play list. Whenever this system is placed in the event mode by depressing the function key F3, the lower event (indicated by a ">"), moves up to also be displayed on the command line. Tracks may be accessed for assignment via depression of the F9 function key. The track assignment for the next event is shown on the lower event line. The insert and delete functions assigned to function keys F7 and F8 apply to the lower of the displayed events.

The lowest portion of the sequencer display is used for other maintenance and recording activities. Thus, recording can be done from the sequencer display rather than the recorder display. Additional menu pages may also be directly invoked as provided.

The functions performed by the dedicated keys as well as the programmable function keys associated with the display area will now be described in more detail.

The dedicated key controls as shown in FIG. 8 will first be described in connection with recording mode. The system maintains a current position counter for the respective time, clip, outtake and event modes, are referred to herein as displays. There are also separate record location counters for the next time and clip values. These are referred to herein as record counters. The record counter values are displayed from either the recorder or sequencer page during recording or whenever the system is placed in the editing mode to observe input signals. In this mode, the camera trigger button is a trigger normally used to start and stop clip recording. The button is on the camera and provides a trigger signal to digitization circuitry. In the sequencer mode, the trigger starts playback of the sequence play list. When the trigger is invoked to start recording, other motion operations and modes are interrupted and the system is set to the clip mode.

The display may be switched to the recorder page. The camera is switched to the program out and monitor out video outputs and microphones are switched to the audio program out and to the speaker. The entire system control panel is then locked out. The system input is then set to be from the camera and recording on the disk is started. Recording is stopped only by the camera trigger. When recording stops, the new clip is added to the clip bin play list. The command line is updated as shown in FIG. 10 with the newly recorded clip. In the editing mode, the time and clip record counters show the next clip and next frame. In the play/pause mode, the time and clip displays are updated to the current clip and last frame.

The "CAM" key switches the camera to the program output. Preset microphones are set to the audio program output. When a disk is in playback mode, depressing this key. pauses disk motion from any clip, outtake or event on and switches the camera to program output. When this key is depressed along with the "PLAY" key, recording of the camera is invoked. When this key is depressed with the "PAUSE" key, the camera is switched to the monitor output and preset microphones are set to the audio monitor output. The time and clip displays are switched to the record counter. When in the event mode, and not on line, the camera may be selected for insertion to any event, for a given time duration or an open-ended defaulted duration as described in more detail below.

The "DISK" key switches the disk to the program output. When in the clip mode, recorded clips are played back. In the event mode, the sequence list is played back. In the outtake mode, the outtakes are played back.

The "EXT" key is identical in function to the "CAM" key except that it selects external video rather than camera as the source for either program output, monitor output or recording or insertion as an event.

Similarly, the "BLACK" button operates similar to the "EXT" and the "CAM" buttons, however, it provides a black image to either program output or the monitor output. Generally, black is not recorded.

The "TEST" button is similar in operation to the "BLACK" button. However, it recalls a color bar pattern from memory and switches this along with a test tone to the audio program and monitor outputs. When depressed with the "PLAY" button, the host camera is switched to the monitor output, and a color bar calibration sequence is invoked. This color bar pattern is stored in memory. When depressed with the "PAUSE" button, the test signal freeze frame is switched to the monitor output and the test tone is switched to the audio monitor output. Its operation is otherwise similar to the "BLACK" button in the event mode.

The "PGM" button turns the program output encoder on and off. The program output encoder is automatically switched on by entering the sequencer mode. The program output encoder defaults to black when it is on.

The "READY" button cycles the disk media up or down. This is forced by invoking the sequence mode as well. When the disk is cycled up, the disk is caused to spin, and the sequence, clip and outtake lists are retrieved from the disk. Also, the last positions of the disk are also recalled, along with the last sequence play list that was used, and the last event in that sequence play list. Mode displays are updated, along with a command line and the ready indication is set to be "ON". On cycle down, the ready indicator is set to "OFF". Clip, outtakes and sequence play lists are stored on the disk drive along with the last clip and outtake positions, the last sequence play list, and the last even position of the sequence play list. The disk drive is then spun down, and a "NOT READY" message is posted on the command line. The "READY" button may be invoked with the "PAUSE" button which matches the ready to off, and operates to eject the disk drive pack. The message "EJECTED" is posted on the command line.

The "PLAY" key switches the disk as the video source to the monitor output and the audio tracks to the monitor audio output. A play command is then initiated for any current sequence event, clip or outtake. If the disk drive is not ready, it invokes the ready initiation sequence. Any current clip, outtake or event is displayed in the command line, which is updated at boundary crossings (transitions). The time display is updated in seconds. Frame and timeline marks are omitted from the display during playback.

The "PAUSE" key is available in numerous modes. From the play mode, motion of clips, outtakes or events is frozen and a freeze of the last frame played is maintained on the monitor output or program output. This system updates the time display at this point in time. From the record mode, recording is paused, however displaying of a previously selected end-to-end input signal is continued. With either of the "CAM", "EXT", or "TEST" buttons, the end-to-end signal is switched to the monitor output only and the time and clip displays are switched to the record counter. When "PAUSE" is depressed with "DISK", the disk is switched to the monitor output only and the current freeze frame is displayed. Time and clip displays are switched to the current position.

The scan left and scan right buttons, indicated by "<<<" and ">>>" are available in the play and pause modes. In the play mode, a scan button operates as latching only and speeds up motion to about three times normal. This scan mode is stopped by pushing the "PLAY" button. From the pause mode, this button operates as latching only and initiates five times normal play speed. By depressing this key several times, the motion can be increased even more. By pressing the opposite direction scan button, the speed can be reduced.

The "MIC>" key, when depressed, performs a binary operation, which turns preset microphones on or off to the program output. It operates with the tracks function in the event mode which is described in more detail below.

The audio input level controls 214 regulate the input gain and level to the four disk tracks. Similarly, audio playback level controls 212 regulate the playback gain and level of the four disk tracks.

The "RETRO/LOOP" key 222 sets the system input to the camera and starts a function called "LOOP/RECORD". The system is set to the clip mode and optionally switches the LCD display to the recorder page. The camera is switched to program and monitor outputs and audio program and monitor outputs are switched to preset microphones. Once in this mode, a standard record may be invoked by normal operations. The "LOOP/RECORD" function stores a loop of video information, for example, a few seconds to a couple of minutes worth, in a memory loop such as a ring-like buffer. This buffer may be in memory or in the disk. When other recording is invoked, the data in the loop is appended to the beginning of the next contiguous recorded clip.

The number keys 0-9, indicated at 204, are simply keypad inputs to displays encountered which are entered via the command line field. These numerical keys are used to provide numeric input presets for other functions, such as for the GOTO function or "set counter" functions, described below. The sign key, "+/−", has three states of operation, plus, minus, and off. It may be invoked before or after a numeric entry and places a plus or a minus sign trailing the command line numeric field. This may then be used to apply the numeric field as a value relative to the current location. For example, a numeric field input can be added or subtracted to the current location value for any time, clip, outtake or event and a GOTO operation can be performed using the results and value.

The "CLEAR" key provides similar functionality of an undo key. For example, in response to this key, the system deletes an entry in an active numeric field, or returns to the sequencer or recorder home page. When at the sequencer page, the system deletes an entry from the command line numeric field, puts the command line in clip mode, or set the clip display to the last recorded clip. When at the recorder page, the clear key sets the clip display to the last recorded clip, invokes GOTO to the last clip freeze frame and updates the clip time display line.

The "FRAME" keys, denoted as "<" and ">", step a display frame back or ahead by one. This is only used for playing a track for each frame to the monitor only. It may also be used in combination with the "SHIFT" key to step ahead or back by 10 frames, for example. It may also be depressed in combination with an IN or OUT key, as described below, to operate a TRIM function on a clip, by moving Mark IN and Mark OUT markers by one frame to the left or to the right (or forward or backward in time). In the clip mode, a clip is altered using the trim function. In event mode, the event is altered using the trim function.

The "PRIOR" key is used to navigate a list such as a clip list, outtake list or a sequence play list. For example, the command line numeric field. is decremented by 1 and a GOTO command is invoked to the mark in point or first frame of the clip and a clip bin play list. A similar operation is performed for the outtake list. In the event mode, the GOTO function is not automatically invoked.

The "NEXT" key has similar operation to the "PRIOR" key except that it goes to the next position in the list rather than the previous position in the list.

The "SHIFT" key has been already been described in a couple of instances above. It may be used in combination with other of the adaptive key functions to be described below. Additionally, the combination of the shift, clear and play keys can be used to reboot the machine.

The "IN" key operates within the active clip, outtake, or event list. When in this mode, for a given clip, outtake or event, the system is updated and moved to the frame previously marked as in the current clip. If no frame is marked, no GOTO operation is performed, and a message is displayed for a brief period of time to the user that there is no mark in the current clip. When this key is used in combination with the SHIFT key, it sets a Mark in point in either the clip or the event. in outtake mode, no marks are made.

The "OUT" key operates similarly to the IN key, but moves to any Mark OUT position in a clip. The SHIFT key when used in combination with this key forms a Mark OUT point.

Finally, the toggle switches provided at 224 include a viewfinder tri-state toggle switch "Finder". When set at "DISK", the monitor OUT is also output to the viewfinder. When in "AUTO", a switch table is used to control the viewfinder. That is, a number of variety of switching arrangements are provided such that when they are entered into using other editing operations, that switch table controls the viewfinder. When in "CAM" state, the camera is directed to the viewfinder.

The control panel switch "Panel" enables local control of the system via the user interface such as disclosed in FIG. 15. When set to OFF, current settings are saved and control of the system is disabled except via the camera trigger. When set to "REM", signifying remote, it enables parallel outside control system through, for example, an ETHERNET or RS232 connection.

A "LIGHT" switch allows power to an external light to be on, off, or automatically turned on or off with the record mode.

Finally, a "POWER" button is provided at 220. This provides power control to the system and the camera. It follows the camera's power switch setting when set in AUTO mode, which is useful for routine record mode. When it is set to "ON" the system is set to ON, independently of the camera's power switch setting. This is useful for sequence playback with no live camera event, to avoid providing power to the camera. When set to "OFF" the system is set to be off, independent of the camera's power switch setting.

Having now described the multiple dedicated buttons on the display, the adaptive key operations and conventions will now be described.

When the recorder page is displayed, such as shown in FIG. 10, function keys F1-F5 provide motion operations identical to the dedicated keys described above. Function key F6 provides the ability to enter a clip data management page. It operates on a current clip and may be invoked before or after recording clips to set up or select data fields, to enter clip titles and text, or to set a merit value for each clip. Thus, each clip may have a data field associated therewith in which to place characteristic data.

The F9 function key sets the system to the sequencer as the home page. The F10 function key is set to display a list of systems set up chapters which may be scrolled with the PRIOR and NEXT keys. These pages of menus of yet additional pages can be provided as desired and provide merely text navigation.

The F11 function key provides information on other keys and modes. When pushed, this button causes "????" to appear in place of the word HELP, and allows a user to push a key for which help information can be provided as a text message.

The F12 function key invokes the outtake mode and playlist. The highest number of the outtakes appears on the command line. At this point, the F6 function key operates as a restore function. The keystroke SHIFT F12 (outtake) keeps the recorder page in clip mode. The current clip is removed from the clip list and is relocated into the outtake play list. The clip display number then decrements by 1 and the command line is updated. in the outtake mode, the F6 function operates as a restore key as mentioned above. It replaces "attributes" and the "set counter" functions. It takes a current outtake from the outtake play list and restores it into the clip in play list. Clip displays are updated to the restored clip. The command resets to the clip mode and updates.

Turning now to the sequencer page, and FIG. 11, the function keys F5, F6, F11 and F12 remain substantially the same as the recorder page, as discussed above.

The F5 key may also may act as a GOTO function which may be invoked when a caution is displayed, for example on the command line. Otherwise, the F5 key operates a PLAY/PAUSE operation which starts and stops clip or event motion at normal speed.

The F6 function key is set to invoke attribute operations as discussed above when in the recorder mode. For example, it may be used mark locators during recording, for grading clip merit after recording, etc. Whenever the numeric field is changed at the command line, the F6 function key changes its function to the SET COUNTER function. This is only available in time and clip modes, but not event the mode. When invoked, if the clip or time exists, this key performs a GOTO function. Otherwise, the current frame is unfrozen and the monitor output is switched to the camera input. The timer clip counter is set a new value and the timer clip display is updated. The next recorder clip is assigned the two time clip values from these counters.

in the event modes the alternate function to "attributes" is "sequence". This function is used to begin playback of the sequence play list. in this mode, if the disk drive is not ready, it is made to be ready and is locked on. A GOTO operation is then performed to bring first event to be current. The program out encoder is set on and to black, if it was off. If the program out encoder is on, the currently selected source is maintained. Functions in the event mode are described in more detail below.

Finally, the F10 function key in the sequencer mode is reserved for accessing lists. The type and formatting of the displayed list is determined by the selected mode. For example, in the page mode, the F10 function key acts as an index and displays a list of system set up chapters as described above. in the time mode, the F10 function key performs a list function which opens and presents a portion of the clip bin, and can display a list of up to ten clips which can be scrolled using the PRIOR and NEXT keys. The same operation is provided when the recorder is in the clip mode. in the outtake mode, the function is similar, but presents a portion of the outtake bin. Finally, in the event mode the operation is similar but opens and presents a portion of the sequence play list. Thus, to see the sequence of events in the sequence play list, from the sequencer page, one would simply press F3 event, F10 list.

Given the foregoing definitions of the keys of the user interface, numerous transactions can be provided on the camera by controlling switching and by maintaining clip list and other list data structures for sequences. These transactions will now be described in detail. The set of transactions should be considered exemplary and not limiting.

As a preliminary matter, before a discussion of editing of sequences and clips, a discussion concerning the meaning of a markout frame will now be provided. in traditional time code based editing systems, the markout frame is regarded as exclusive within an edit decision list event. The in frame is played as part of any event in a sequence, but the out frame is not played. Thus, traditional time code based editing systems do not include the outgoing frame in the online assembly of an edit decision list. Thus, the markout frame is treated as the first frame following the desired event duration. An ambiguity that editors should be aware of with visually based editing systems using outframe exclusion is that the displayed outpoint freeze frame is not part of the assembly sequence. What should be set as the mark out frame in such a system is the frame following the desired final frame for the clip or the event. For many routine editing decisions this visual ambiguity is not significant, but the selection of the outframe is no longer purely instinctive. Editors instinctively tend to select the last frame that they want included in the event. This is a very natural extension of the experience and physical act of cutting film. Video editing systems vary by design. To support the natural experience, the outframe in this system is consistently operated to be inclusive when marking or playing clips are events. The inclusive outframe technique also provides clear expression of the true visual relationship between event boundaries and further simplifies trimming operations.

Some editing conventions for the sequence play list will first be described. The function key F7 is used for the delete function in the clip, outtake and event modes. in a clip and outtake modes, upon depression of the delete key, a warning caption is displayed adjacent to the function key F6. Depression of the F6 key deletes the clip from the clip bin, or the outtake from the outtake bin. The display is decremented by one and the time and clip displays, along the command line, are updated. The F6 attributes caption is restored. Deletion of a clip from the outtake bin deletes it completely and frees up the disk space for storing further clips.

If the delete key is invoked from the event mode, the time and clip displays are updated and a warning message is displayed adjacent the F6 function key. Depressing the F6 function key then deletes the event data from the play list and ripples any contiguous subsequent events up in the list, until any null or black event mounted is attained. The event display position is not incremented, but the event display is updated.

The INSERT command, invoked by the F8 function key, can be invoked from either the clip or event modes. It inserts a clip into an event position if invoked in the clip mode. If evoked in the event mode, it ties a current clip to the current event. It does not normally replace previous event data. Any previous event data is generally rippled to the next event, and any contiguous subsequent events are also rippled through the sequence play list. The event counter is then incremented by one and the event display is updated, and the command line is returned to clip mode.

The first transaction to be described is mounting a disk in the recorder mode. FIG. 12 illustrates the display when a disk drive pack is ejected. Note that counter and location displays are suppressed, and the adjacent to the F1 function key is the message "ejected". When the disk drive pack is loaded, the READY command is now available adjacent the F1 function key, which can then be evoked to cause the disk drive to spin. in this state, the message next to the F1 function key is "ready - - - ". The current time and clip record counters are updated when the READY key is depressed. At this state, the "READY" indication is set to be "on" and the disk drive is at normal speed. The last clip freeze-frame is output to the monitor output with an overlay showing the location. The time clip display is also updated. in this state, the display appears as shown in FIG. 13, where the time and clip display as shown are merely exemplary. At any time, the disk drive may be spun down and, the recorder returns to a NOT READY state. This is similar to FIG. 13 adjacent to the function key F1 is the message "ready - - - ". in this state, the record counter values are maintained, and the disk drive is still loaded. The freeze frame display output to the monitor output is blank. When the drive pack is ejected, the record counter values are zeroed out.

A similar transaction, as seen from the sequencer page, will now be described in connection with FIGS. 14 and 15. FIG. 14 shows a sequencer page when the drive pack is ejected. Generally, the sequencer is shown in clip mode, but with displays suppressed. When the disk drive pack is physically loaded, the command line message changes from "ejected" to "not ready". The READY key may now be invoked to spin the disk drive. in this instance, the user would use the dedicated ready key. When the disk drive pack is loaded and the disk drive is spinning, the last clip freeze frame appears at the monitor output. The event counter is set to be the last event as indicated adjacent to the F3 function key. Similarly, the time and clip record counters are updated and displayed. At this time, any other functions or transactions can be performed, after which the system could be shut down. By depressing the READY key a second time, the disk drive is spun down. However. counters and display values are maintained and the freeze frame display at the monitor out is blanked. The command line is changed from that shown in FIG. 2 to indicate that the system is "not ready". Ejecting the disk drive pack zeros out the system.

Once a ready state is achieved such as shown in either of FIG. 13 or 15 in a sequencer or recorder page, other transactions may be performed by the user.

A transaction for selecting a navigating and operating mode will now be described. FIG. 16 shows the sequencer page in the time operating mode. The current position is the last frame of the last recorded clip. INSERT and DELETE functions are suppressed. The function key F8 is assigned to return to the recorder page.

By depressing the F4 function key, the sequencer is switched to page access mode in which INSERT and DELETE functions are still suppressed and the recorder is still available through use of the. F8 function key. The F10 function is then changed to "index". The time display adjacent to the F2 function key is changed to a page display, e.g., ".1", as shown in FIG. 17.

Depression of the F2 function key switches the sequencer to the clip operating mode, which is the default mode for the sequencer. The tracks display shows the recorded tracks of a clip above the F9 function key command and shows the tracks of an event below the F9 function key command as shown in FIG. 18. Depression of the dedicated CLEAR key resets the system to this default clip mode.

Depression of the F3 function key places a sequencer in event mode, such as shown in FIG. 19. The event mode remains active with transaction key strokes and returns the clip mode after a 10 second time out. in event mode, the F6 function key is assigned to "sequence" which allows a sequence play list to be played back.

The F9 function key, when depressed in either of the time, page, clip or event modes, sets the sequencer to the clip mode tracks manager, as shown in FIG. 20. This track control is also available for event mode. in clip mode, any tracks switched on are record enabled, such as shown adjacent to the F7-F12 function keys. Left numbers in the right-hand half of the display indicate the tracks to be recorded. The PATCH key on function key F8 allows audio channels to be reconfigured.

In the tracks manager, the F6 function key sets a playback track for operations. The desired playback clip is currently displayed. Selecting any one track for play locks it out from recording. No original playback clip information is replaced. New clips are created using the record counter values, which inherit marks and timing from the playback clip. This allows them to be easily synchronized later. When a track is selected for play, such as track 2 as indicated adjacent to the F10 key, the status is indicated as "play".

The sequencer set to the event mode tracks manager is shown in FIG. 21. in the event mode, the tracks control sets playback tracks. The event mode tracks manager controls the switching on of microphones, tracks on for two clips, and left and right channel assignments output for sources in each event. Clips selector indicated adjacent the F5 and F6 function keys assigns the candidate new clip to the first or second clip (source 1 or 2). Tracks may be toggled on or off. Conflicts are locked out. For a standard insert event, the clip selector may be ignored. It defaults the candidate new clip to the first and ripples any previous first clip to the next event, thus performing the standard insert. Selecting function key F9, "tracks", depressing function key F5, for the first clip, inserts the new clip into the event. The old clip does not ripple. Thus, function keys F9 and F5 set up a replace operation on F8.

The process of finding and playing a clip will now be described. in the sequencer page, when the clip key is depressed, the display is such as shown in FIG. 18. The command line automatically displays the current clip and field. The track display shows the available clip tracks. Numeric input enters the field from the right. Thus, when a user inputs characters, for example, 2 and 5, the command line clears the previous clip data and the function keys F5 and F6 change their caption and function to numeric input control, namely GOTO and SET COUNTER function, as shown in FIG. 22. The GOTO function is then depressed (function key F5). When GOTO is invoked, the command line display is updated with the new clip data. The first frame of the new clip entry is retrieved and displayed on the monitor output. The time and clip displays are also updated. The function keys F5 and F6 are returned to the their original functions. If the disk is available on line, this GOTO operation is suppressed. After execution of the GOTO function of the display is such as shown in FIG. 23. Depression of the NEXT key at this point in time advances the command line clip by 1. The command line field is incremented by 1 and a GOTO operation in the clip mode is executed. Displays, command line, and key captions are updated, such as shown in FIG. 24. Given a clip, and depression of the F5 function key to invoke the "play" function, normal play back motion begins. Finding an playing back an outtake operates in a similar manner. This process generally involves four steps: depressing the OUTTAKE key, inputting numeric indicia of the desired outtake, depressing the GOTO key, and depressing the PLAY key. The differences between the outtake and clip modes are described above. Generally speaking, in the outtake mode the restore function is used instead of the "set counter" function for function key F6. Additionally, the command line refers to an outtake rather than a clip.

Finding and playing an event is similar to finding and playing an outtake or a clip. First, a user depresses the event key, and the event display is presented. The desired event number is then input in a command line. Depressing the F5 key causes a GOTO function, jumping to the event. Depressing the PLAY key starts playback of the event. The event display is shown in FIG. 25. The command line indicates that event 5, in this example, corresponds to a clip 30. If, for example, new numbers were input as the desired event, the command line is then changed to indicate this desired event and the GOTO option is then presented at function key F5. Depressing of the F5 key advances directly to the desired event. Time and clip displays update such as shown in FIG. 26, and the GOTO key resets to the play/pause option. The command line indicates the current event. Depressing the PLAY key starts playback of events in the sequence play list. Since an event list may contain events of open duration, such a camera source, these are presented as the input sources or as freeze frames. in this mode, depressing the PLAY key steps to the next event when the play list in online to the program out.

Inserting a clip into an event is similar to finding and playing back an event, but rather than pressing PLAY to play back, the EVENT key (function key F3) is depressed and the event display is presented. At this point in time, depressing the INSERT key (function key F8) places the selected clip into the event. Depressing of the EVENT key can also occur after the user has pressed the PLAY key after finding the clip to be inserted. When switched to event mode from clip mode after selection of a clip, the display appears like FIG. 27. At this point in time, depressing the INSERT key completes the insert to event operation. That is, the last empty event, in this example event 5, is set to the selected clip. At this point in time, the command line returns to the clip mode and the event display is incremented by 1 and updated such as shown in FIG. 28.

Selecting tracks before an insert will now be described. Once in the event mode, such as shown in FIG. 27, an optional transaction may be evoked before an insert to preset desired tracks. in this case, the function key F9, associated with tracks, is depressed. The microphone and track positions are displayed, such as shown in FIG. 29. in this instance, the function key F8 toggles the master microphone between OFF, SET, and ON. Microphones 1-4 are toggled using F9-F12 function keys to be either left, right, both or off. Once the track selection is made using the F7-F9 keys, depression of the F1 key accepts the final tracked assignment and returns to the event mode. At this point in time, the insert key may be depressed to insert the clip into the event.

Automatic sequential clip inserts into events can also be made. This provides a shorthand method to rapidly build a sequence because clips need not be marked or trimmed in advance, and events may be trimmed after a sequence playlist is built. Additionally tracks may be set after a sequence playlist is built. Beginning in the clip mode as described above, in connection with finding a clip, the GOTO function need not be performed. Rather, the INSERT key may be simply depressed. The event display is simply updated and incremented by 1 and the command line remains in the clip mode. Thus, a user can input a number and hit the INSERT key followed by another number and then the INSERT key etc. Thus, a sequence can be rapidly built.

Deletion of an event is similar to finding and playing back an event. However, instead of depressing the PLAY key, the DELETE key is depressed instead. After pressing the DELETE key, the display updates to what is shown in FIG. 30 to provide the message "are you sure" adjacent to function key F6. Depressing the function key F6 completes the delete. After the delete is executed the event display updates and subsequent events ripple up to fill in the list if any. The system then returns to the clip mode.

Finding and trimming a transition or event will now be described. Generally, the same steps are followed so as to identify the event, including depressing the event key, numerical keys, and the GOTO key. At this stage, the user can depress the IN key and hold it down. The frame trim keys are then depressed a number of times to move the mark in point as desired. The user can watch the display area and monitor the frame status as provided by the two symbol indication near the top center of the display. Holding down the OUT key likewise with each depression of the frame key moves the mark out event.

Playing a sequence play list to program out will now be described. The EVENT key is depressed to present the event display and enter the event mode. A desired event number may optionally be depressed at that point as well. At this point in time, rather than depressing the GOTO key, the user may depress the function key F6 associated with the function "sequence". The command line displays "sequence=event 3". The system automatically preloads event 3 and sets the program out encoder to ON. Depressing either the camera trigger or the play key starts playback of the sequence playlist. in accordance with the media data controller described above, while event is being played back, another is being preloaded into memory.

The transaction of adding a second clip or track to an existing event, such as a second audio track, will now be described. This is similar to finding the desired new clip from the clip list and then entering the event mode, through the key sequence of commands CLIP, NUMBER, GOTO and EVENT. Once in the event mode, the "prior" key can be selected to identify a previous existing event. At this point in time, the command line is updated to indicate the current event and the currently selected clip. The event window indicates the currently selected event and the event which is stored therein. Depressing the TRACKS key at this point in time opens the track manager display. The track manager display adjacent to the F5 and F6 function keys indicates the first clip, the new clip, and an indication of the tracks used in the second clip. Depression of the F6 key selects the second clip as the candidate clip as a second source. This clip does not replace the first clip. It also does not ripple events on insert. The command line then updates to show both candidate clips and tracks displays to show tracks for the second clip such as shown in FIG. 31. The desired playback tracks for the second clip are then set as described above. Conflicts are locked out. Thus, in this example, the new clip could only be selected for audio tracks 1 and 2. Once the desired playback tracks are selected, the function key F1 can be depressed to accept the preset clip assignments and track assignments and closes the tracks manager display. No event insert has taken place. The event window then reappears as shown in FIG. 32. Depressing the function key F8, REPLACE, inserts the combined event into the event display. The event display does not increment and the event display and command line are updated. The time selected for the event is the duration time of the shortest clip.

A final exemplary transaction involves playing forward to mark the next transition in a sequence. After insertion of a second clip in an event, depressing the F3 function key returns to the event mode. Depressing the GOTO key presets the pair of clips. It is then possible to play or scan forward to the desired mark out point. The frame keys can be used to find a Mark out frame, for example. After selection of the mark out frame, the tracks manager may then be opened by depressing the F9 function key. When the track manager opens, it is preset to the first clip tracks. Depressing the SHIFT F6 function key switches to the second clip tracks. Depressing the F4 function key matches marks to complete the event. The "match marks" operation matches the out marks for both of the clips and then the in marks for both of the clips, and removes any old mark outs. The event display is then incremented by 1. The system then returns to the clip mode and the transaction is complete.

It should be understood that the foregoing transactions are merely exemplary of the multitude of functions that this non-linear recording method and technology can provide. These functions are designed to provide a simple interface for high-speed field editing on recording location without any mouse or other graphical user interface. A videographer can perform editing functions at any time, without the need for transmission to an editing studio. This provides an interaction between the videography and editing steps in video production.

Other functionality may also be provided in such a device. For example, given the ability to provide attributes, searching of these attributes, searching of these attribute fields may provide an easy way to quickly identify a variety of clips. For example, if an attribute is a numeric value, such as a grating value of a clip on a scale of 1 to 10, clips having a value above a given threshold can be retrieved for selection and editing purposes.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

The invention claimed is:

1. A digital motion picture recorder, comprising:
   a housing sized to be portable for use by an individual;
   a motion picture camera mounted within the housing and having an output providing live digital video information;
   a digital random access computer readable and writeable medium mounted within the housing;
   a processor, in the portable housing, configured to enable the individual to provide inputs to control capture of live digital video information from the motion picture camera into a clip comprising a data file in a computer readable file format and stored on the digital random access computer readable and writeable medium, wherein the digital motion picture recorder stores a plurality of such clips;

wherein the processor is further configured to enable the individual to specify a sequence of segments of the plurality of data files stored on the digital random access computer readable and writeable medium; and wherein the processor is further configured to enable the individual to initiate playback of full motion video using the digital video information from the plurality of data files stored on the digital random access computer readable and writeable medium according to the specified sequence of segments of the plurality of data files;

a user interface on the portable housing including:
a display for displaying information;
a plurality of buttons;
wherein each function associated with each of the plurality of buttons is communicated to the individual by information displayed on the display;
wherein the user interface has a plurality of modes, including at least a clip mode and a sequencer mode; wherein, in clip mode, the buttons permit the individual to navigate among and to select clips of time-based media stored on the digital random access computer readable and writeable medium; and wherein, in sequencer mode, the buttons permit the individual to specify the sequence of segments.

2. The digital motion picture recorder of claim 1, wherein the processor is further configured to assign a unique identifying number to each clip.

3. The digital motion picture recorder of claim 2, wherein the processor includes a clip counter that is incremented after recording a clip, and wherein the unique identifying number for each clip is provided by the clip counter.

4. The digital motion picture recorder of claim 1, wherein the live digital video information also has associated live digital audio information, and wherein the associated live digital audio information is stored in association with the clip of live digital video information.

5. The digital motion picture recorder of claim 1, wherein the processor is further configured to maintain one or more bins, wherein each bin has a clip list which indicates the recorded clips stored in that bin.

6. The digital motion picture recorder of claim 5, wherein the processor is further configured to receive an input from a user indicating a bin in which a clip is to be recorded.

7. The digital motion picture recorder of claim 1, wherein the processor is configured to permit the individual to specify a sequence play list comprising a programmable list of events.

8. The digital motion picture recorder of claim 7, wherein an event references a source and duration of time.

9. The digital motion picture recorder of claim 8, wherein the source includes recorded digital video information.

10. The digital motion picture recorder of claim 9, wherein the source includes a clip stored on the digital random access computer readable and writeable medium mounted within the housing.

11. The digital motion picture recorder of claim 9, wherein an event has mark in and mark out locations.

12. The digital motion picture recorder of claim 8, wherein the source includes the live digital video information.

13. The digital motion picture recorder of claim 8, wherein an event has track playback assignments that may be set by the individual.

14. The digital motion picture recorder of claim 11, wherein the processor is configured to permit the individual to trim in and trim out the mark in and the mark out locations.

15. The digital motion picture recorder of claim 14, wherein the processor is configured to permit the individual to select an event, to permit the individual to select one of the mark in and mark out locations, and
to permit the individual to indicate a modification to the selected location one video frame at a time.

16. A digital motion picture recorder, comprising:
a housing sized to be portable by an individual during use of the digital motion picture recorder;
a motion picture camera mounted within the housing and having an output providing live digital video information;
a digital random access computer readable and writeable medium mounted within the housing;
inputs on the portable housing, operable by the individual, to control capture of live digital video information from the motion picture camera;
a processor, in the portable housing, configured to respond to the inputs to control capture of live digital video information from the motion picture camera into a clip comprising a data file in a computer readable file format and stored on the digital random access computer readable and writeable medium, wherein the digital motion picture recorder stores a plurality of such clips;
a display on the portable housing for displaying information;
a plurality of buttons on the portable housing;
wherein each function associated with each of the plurality of buttons is communicated to the individual by information displayed on the display;
wherein the processor is configured to enable the individual, through the plurality of buttons, to specify a sequence of segments of the clips stored in the plurality of data files stored on the digital random access computer readable and writeable medium, wherein a segment of a clip can be specified using a mark in and a mark out point at any video frame in the clip, wherein the processor controls the display and the plurality of buttons to provide a plurality of modes, including at least a clip mode and a sequencer mode; wherein, in clip mode, the buttons permit the individual to navigate among and to select clips of time-based media stored on the digital random access computer readable and writeable medium; and wherein, in sequencer mode, the buttons permit the individual to specify the sequence of segments; and
wherein the processor is further configured to enabling the individual to initiate playback of full motion video using the digital video information from the plurality of data files stored on the digital random access computer readable and writeable medium according to the specified sequence of segments of the plurality of data files.

* * * * *